(12) United States Patent
Berthelot et al.

(10) Patent No.: US 11,167,487 B2
(45) Date of Patent: Nov. 9, 2021

(54) SYSTEM FOR DEPOSITING MATERIAL AND ASSOCIATED METHOD

(71) Applicant: KELENN TECHNOLOGY, Palaiseau (FR)

(72) Inventors: Thomas Berthelot, Les Ulis (FR); Didier Rousseau, Palaiseau (FR)

(73) Assignee: KELENN TECHNOLOGY, Palaiseau (FR)

( * ) Notice: Subject to any disclaimer, the term of this patent is extended or adjusted under 35 U.S.C. 154(b) by 0 days.

(21) Appl. No.: 16/635,517

(22) PCT Filed: May 16, 2019

(86) PCT No.: PCT/EP2019/062656
§ 371 (c)(1),
(2) Date: Jan. 30, 2020

(87) PCT Pub. No.: WO2019/228821
PCT Pub. Date: Dec. 5, 2019

(65) Prior Publication Data
US 2021/0069971 A1    Mar. 11, 2021

(30) Foreign Application Priority Data
May 30, 2018    (FR) ...................... 1854610

(51) Int. Cl.
*B29C 64/209*    (2017.01)
*B33Y 10/00*    (2015.01)
(Continued)

(52) U.S. Cl.
CPC .......... *B29C 64/209* (2017.08); *B29C 64/112* (2017.08); *B33Y 10/00* (2014.12); *B33Y 30/00* (2014.12); *B33Y 40/00* (2014.12)

(58) Field of Classification Search
CPC ..... B29C 64/209; B29C 64/112; B33Y 10/00; B33Y 30/00; B33Y 40/00
See application file for complete search history.

(56) References Cited

U.S. PATENT DOCUMENTS

| | | | |
|---|---|---|---|
| 10,384,227 B2 * | 8/2019 | Sakai | .............. B41J 2/04561 |
| 10,513,427 B2 * | 12/2019 | Hauke | ................ B01D 36/001 |
| 2017/0008755 A1 * | 1/2017 | Ishida | .................. B67D 99/00 |

FOREIGN PATENT DOCUMENTS

| | | | | |
|---|---|---|---|---|
| EP | 2206562 A2 * | 7/2010 | .......... | B05C 11/101 |
| EP | 2206562 A2 | 7/2010 | | |

OTHER PUBLICATIONS

French Search Report from French Patent Application No. 1854610, dated Feb. 5, 2019.
(Continued)

*Primary Examiner* — Yung-Sheng M Tsui
(74) *Attorney, Agent, or Firm* — Greer, Burns & Crain, Ltd.

(57) ABSTRACT

A deposition system including:
  a container arranged to contain material to be deposited and including an inlet and an outlet,
  a pneumatic system arranged to inject, through the entrance, gas in the container, so this gas exerts pressure on the material to be deposited. The deposition system including a controller of the pneumatic system arranged to control at least one injection, through the inlet, of gas at an adjusting pressure, so that a convex meniscus of material to be deposited protrudes from the outlet of the container, then at least one gas' injection, through the inlet, respectively at least a deposition pressure greater than the adjusting pressure, so that the material to be deposited flows out of the container by its outlet.

27 Claims, 3 Drawing Sheets

(51) Int. Cl.
*B33Y 30/00* (2015.01)
*B33Y 40/00* (2020.01)
*B29C 64/112* (2017.01)

(56) References Cited

OTHER PUBLICATIONS

International Search Report from International Patent Application No. PCT/EP2019/062656, dated Sep. 3, 2019.
Written Opinion of the ISA from International Patent Application No. PCT/EP2019/062656, dated Sep. 3, 2019.

* cited by examiner

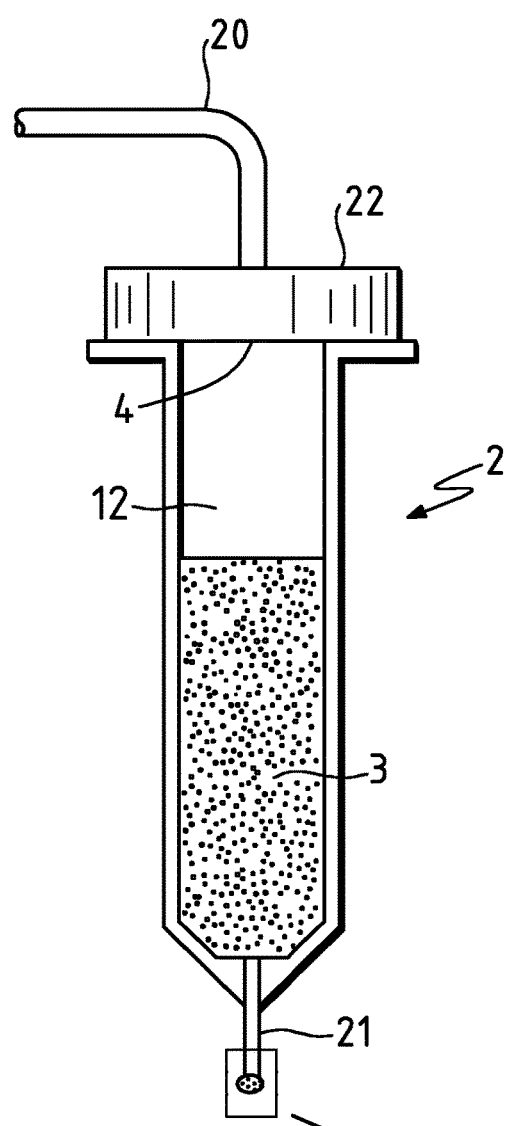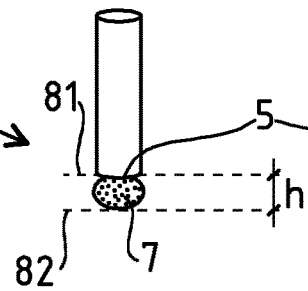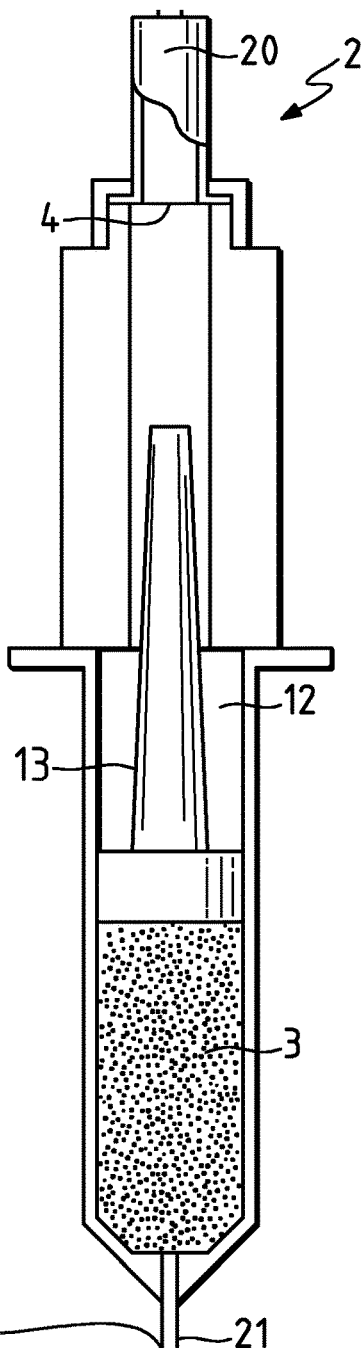
FIG.1
FIG.2

SYSTEM FOR DEPOSITING MATERIAL AND ASSOCIATED METHOD

BACKGROUND

The present invention relates to the field of material deposition processes and systems. The present invention relates to the deposition of solid material, paste, viscous liquid or, conversely, very liquid weakly viscous.

The present invention relates in particular to systems and methods for additive manufacturing on complex 3D or 3D substrates and relates, by way of example, to the fields of prototyping, 3D printing or bio-printing.

It is known in the prior art printing processes without contact. It exists different variants of these processes, each of the variants requires a clean deposition system including deposition technology adapted to a particular type of material to be deposited. The inkjet technique is known which is used in the case of inks with low viscosities generally between 2 and 20 centipoises. We know the distributors of paste (known as solid paste dispenser) and\transfer techniques (eg Laser-Induced Forward Transfer) used in the case of highly viscous inks or pastes having a viscosity generally between 2000 and 50,000 centipoises. It is also known extrusion techniques performed on solid material, on very viscous inks or on paste. Finally, we know the Meniscus coating technique (meniscus coating) but this allows to print only solid areas.

None of the aforementioned techniques can deposit any type of ink. This is particularly the case with inkjet technology for which a deposition apparatus can only be used for liquid inks specially formulated for this method of printing.

Apart from the ink-jet process, these techniques do not offer good control of the quantities of deposited material, in particular during the launch and the shutdown phases of the printing/deposition process.

Finally, none of these techniques makes it possible to deposit quantities of material from few nanometers to several microns of thickness.

It is well known, in the state of the prior art, the printing processes named with contact. These methods include micro contact (micro contact printing) and micro-array deposition (spotter) techniques array). These two techniques allow to deposit only low viscosity inks. We also know the screen printing technique but the latter is only suitable for the deposition of paste.

Contact printing techniques can produce deposits only on planar and very rough deposition surfaces. Contact deposition techniques cannot deposit material on rough surfaces and/or with complex topographies.

An object of the invention is in particular:
- depositing, with the same deposition system, solid material to be extruded, high-viscosity liquid material and low-viscosity liquid material, and/or
- depositing material on any type of substrate having any type of topography and any type of roughness, and/or
- to proceed, with the same deposition system, to material deposition in the form of matrix of points and in the form of pattern, and/or
- improve the quality of deposition, in particular during the launching and the shutdown phases of the deposition, and/or
- to deposit material with thickness from few nanometers to several microns, and/or
- to modify, in real time, the quantity deposited, during the deposition method, in order to modify for example the design and/or a dimension and/or a geometry of pattern deposited, and/or
- to achieve a constant and homogeneous deposition of material irrespective of the amount of material remaining in the container.

SUMMARY

For this purpose, according to a first aspect of the invention, there is provided a deposition system comprising:
- a container arranged to contain material to be deposited and comprising an inlet and an outlet,
- a pneumatic system arranged to inject, through the inlet, gas into the container such that this gas exerts, directly or indirectly, a pressure on the material to be deposited,
- the deposition system comprising control means of the pneumatic system arranged to control at least:
  - an injection, through the inlet, of gas at an adjusting pressure (PM), so that a convex meniscus of material to be deposited protrudes from the container at the outlet, and then
  - at least one injection, through the inlet, of gas at respectively at least one deposition pressure (PD, PDi) greater than the adjusting pressure, so that the material to be deposited flows out of the container through the outlet.

Deposition system according to the first aspect of the invention, wherein the control means of the pneumatic system may be arranged to control several injections, through the inlet, of gas at several deposition pressures (PD, PDi) different from each other so that the material to be deposited flows out of the container through the outlet at different speeds, said deposition pressures being greater than the adjusting pressure (PM).

Depositing system according to the first aspect of the invention, wherein the pneumatic system may comprise a source (R), called adjusting source, arranged to produce gas at the adjusting pressure (PM) and at least one source (P1, Pi), called deposition source, arranged to produce gas at at least one source pressure (PS, PSj), said at least one source pressure being preferably at least 1.01 time, more preferably at least 1.015 times, greater than the adjusting pressure.

According to a first improvement of the deposition system according to the first aspect of the invention, the pneumatic system may comprise a single deposition source (P1).

In the case where the system comprises a single deposition source and a single deposition pressure PD, the pressure PS of the single source may be equal to a single deposition pressure PD.

Deposition system according to the first improvement, wherein the source pressure (PS) may be greater than the deposition pressure (PD), or than at least one of the deposition pressures (PDi).

Deposit system according to the first improvement, wherein the source pressure (PS) may be lower than the deposition pressure (PD), or than at least at one of deposition pressures (PDi).

Deposit system according to the first improvement, wherein the source pressure (PS) may be equal to the deposition pressure (PD), or to one of the deposition pressures (PDi).

The source pressure PS may be greater than or equal to a deposition pressure PDsup, said deposition pressure PDsup being greater than each of the other deposition pressures PDi.

The adjusting pressure PS may be less than or equal to deposition pressure PDinf, said deposition pressure PDinf being lower than each of the other deposition pressures PDi.

Deposition system according to the first improvement, wherein the pneumatic system may be arranged such that the deposition pressure (PD), or more of the deposition pressures (PDi), of gas injected into the container is obtained by
mixing gas from the adjusting source (R) and gas from the deposition source (P1), and/or
decreasing or increasing of the gas pressure from the deposition source, and/or
increasing the gas pressure from the adjusting source.

According to a second improvement of the deposition system according to the first aspect of the invention, the pneumatic system may comprise a plurality of deposition sources (P1, Pi), each of said plurality of deposition sources being arranged to produce gas at a source pressure (PS, PSj) different from each of the other source pressures of the other deposition sources.

Deposition system according to the second improvement, wherein each source pressure (PS, PSj) may be equal to a different deposition pressure (PD, PDi).

Deposit system according to the second improvement, wherein at least one source pressure (PS, PSj) may be greater than the deposition pressure (PD), or than each deposition pressure (PDi).

Deposition system according to the second improvement, wherein at least one source pressure (PSj) may be lower than the deposition pressure (PD), or than each deposition pressure (PDi).

Deposition system according to the second improvement, wherein the pneumatic system may be arranged so that the deposition pressure (PD), or more of the deposition pressures (PDi), of gas injected into the container is obtained by:
mixing gas from the adjusting source (R) and gas from at least one of the deposition sources (P1, Pi), and/or
mixing gas from a deposition source and gas from at least one of the other deposition sources, and/or
decreasing or increasing the gas pressure, said from at least one of the deposition sources, and/or
increasing the gas pressure from the adjusting source.

Deposition system according to the first aspect of the invention, wherein the adjusting source (R) and/or each deposition source (P1, Pi) may be a gas tank storing gas at its respective adjusting pressure (PM) and/or source pressure (PS, PSj).

Deposition system according to the first aspect of the invention wherein each considered gas tank may have a volume at least 5 times, preferably at least 10 times, greater than the sum of the volume of the container and the volume of a gas circuit connecting this considered gas tank to the inlet.

In a more preferred manner, each reservoir considered may present a volume at least 20 times, preferably at least 50 times greater than the sum of the volume of the container and the volume of a gas circuit connecting the reservoir considered at the inlet.

Depositing system according to the first aspect of the invention, wherein the control means may comprise a multichannel valve, called switching valve, connected to:
the inlet of the container,
at least one of the sources (R, P1, Pi),
a venting system,
said multichannel valve being arranged to switch from an injection of gas from a deposition source or from an adjusting source towards an injection of gas from another deposition source or adjusting source so as to produce an instantaneous change in pressure in the container.

Deposit system according to the first aspect of the invention wherein the adjusting pressure (PM) and the deposition pressure (PD), or each of the deposition pressures (PDi), may be lower than or equal to 200 kPa above atmospheric pressure.

Deposit system according to the first aspect of the invention, wherein the adjusting pressure (PM) may be lower than the atmospheric pressure.

Deposition system according to the invention, wherein the adjusting pressure PM and the deposition pressure PD, or each of the deposition pressures PDi, may be less than the atmospheric pressure.

Deposition system according to the invention, wherein the adjusting pressure PM and the deposition pressure PD may be lower than atmospheric pressure, and another of the deposition pressures may be greater than atmospheric pressure.

The adjusting pressure PM can be lower at the atmospheric pressure so that the material to be deposited having a viscosity such that it should flow out of the container if the pressure PM was equal to or greater than the atmospheric pressure, forms the convex meniscus and does not flow.

The system according to the first aspect of the invention may comprise a system arranged to:
set in motion the container relatively to a deposition surface, or conversely, in a plane parallel to the deposition surface, said plane xy, according to a predetermined path, and/or
move away and/or bring closer the container relatively to the deposition surface, or conversely.

The system according to the first aspect of the invention may comprise a processing unit programmed and/or configured to control an amount of material deposited on the deposition surface depending on a relative position of the container with respect to said surface by producing:
a modification, and/or an adaptation, of the relative velocity of the container with respect to the deposition surface, or conversely, and/or
a modification, and/or an adaptation, of a distance between the outlet of the container and the deposition surface, and/or
a modification, and/or adaptation, of the deposition pressure (PD, PDi) selected.

The depositing system according to the first aspect of the invention may comprise one or more optical imaging devices arranged to image a deposition area, and/or an area comprising the outlet of the container, and/or at least a part of the deposition area, so that the processing unit is arranged to monitor the amount of material deposited and/or the relative position of the container with respect to the deposition surface and, depending on this monitor, is arranged to modify and/or adjust:
the gas pressure injected into the container, and/or
a relative movement speed of the container relative to the deposition area, or conversely, and/or
the distance between the outlet and the deposition area, and/or
the relative position of the container relative to the deposition surface.

Deposition system according to the first aspect of the invention, comprising a distance sensor arranged to, prior to the deposition of the material to be deposited, measuring a topography of the deposition surface along the predetermined path along which the material to be deposited will be deposited so as, during the deposition, to maintain a constant distance between the outlet of the container and the deposition surface during displacement of container according to the predetermined path.

Deposition system according to the first aspect of the invention, wherein the control means may comprise a pressure regulating multichannel valve, said deposition valve, being located, with respect to a gas path extending from the adjusting (R) and deposition sources (P1, Pi) to the container, downstream of the deposition source and upstream of the multichannel switching valve and being arranged for decrease, or respectively increase, the gas pressure of a deposition source to an intermediate deposition pressure (PDINT) lower than, or respectively greater than, the source pressure (PS, PSj) of this deposition source and greater than the adjusting pressure (PM), and wherein the control means may be arranged to supply gas at the intermediate deposition pressure in a portion of a circuit, constituting a deposition source, connecting said deposition valve to said multichannel switching valve.

Preferably, the control means may comprise two or more deposition valves.

It is also proposed, according to a second aspect of the invention, a deposition method implemented in a deposition system, said system comprising:
- a container in which there is material to be deposited and comprising an inlet and an outlet,
- a pneumatic system comprising control means of the pneumatic system. The method is characterized in that the pneumatic system injects, through the inlet, gas into the container so that the gas exerts, directly or indirectly, a pressure on the material to be deposited, the method comprising a control, by the control means of the pneumatic system:
- of an injection of gas, via the inlet, at an adjusting pressure (PM), so that a convex meniscus of material to be deposited protrudes from the container at the outlet, and
- of at least one injection of gas, though the inlet, at respectively at least one deposition pressure (PD, PDi) greater than the adjusting pressure, so that the material to be deposited flows out of the container in a material deposit on a deposition surface.

The deposition system in which the method is implemented may be the deposition system according to the first aspect of the invention.

Any feature of the deposition system according to the first aspect of the invention may be integrated into the deposition system in which the method is implemented.

Method according to the second aspect of the invention that may comprise a control, by the control means, of several injections, through the inlet, of gas at several deposition pressures (PD, PDi) different from each other, so that the material to be deposited flows at different speeds out of the container through the outlet, said deposition pressures being greater than the adjusting pressure (PM).

The several injections, via the inlet, of gas at several deposition pressures PDi different from each other are successively carried out to other.

Method according to the second aspect of the invention that may comprise:
- between the gas injection at the adjusting pressure (PM) and the at least one gas injection at the least at the one deposition pressure (PD, PDi), a decrease of a distance (f) between the meniscus and the deposition area until a capillary bridge is formed between said deposition surface and the meniscus,
- subsequent to the formation of the capillary bridge, the at least at the one gas injection at the at least one deposition pressure (PD, PDi),
- subsequent to the at least one injection of gas at the at least one deposition pressure (PD, PDi), a new gas injection at the adjusting pressure so that the material to be deposited no longer flows out of the container,
- subsequent to the new gas injection at the adjusting pressure, an increase of the distance between the meniscus and the deposition surface until rupture of the capillary bridge between the deposition surface and the meniscus.

Method according to the second aspect of the invention, wherein the pneumatic system (6) may comprise a source (R), called adjusting source, producing gas at the adjusting pressure (PM) and at least one source (P1, Pi), called deposition source, producing gas at at least one source pressure (PS, PSj), said at least one source pressure being preferably, at least 1.01 times, more preferably at least 1.015 times, greater than the adjusting pressure.

Method according to a first improvement of the second aspect of the invention, wherein the pneumatic system comprises a single deposition source.

Method according to the first improvement of the second aspect of the invention, wherein the source pressure PS is greater than the deposition pressure PD, or than at least one of the deposition pressures PDi.

Method according to the first improvement of the second aspect of the invention, wherein the source pressure PS is lower than the deposition pressure PD, or than at least one of the deposition pressures PDi.

Method according to the first improvement of the second aspect of the invention, wherein the source pressure PS is equal to the deposition pressure PD, or to one of the deposition pressures PDi.

Method according to the first improvement of the second aspect of the invention, wherein the pressure PD, or more of the pressures PDi, of gas injected into the container is obtained by:
- mixing gas from the adjusting source and gas from the deposition source, and/or
- decreasing or increasing the pressure of gas from the deposition source, and/or
- increase of the gas pressure from the adjusting source.

Method according to a second improvement of the second aspect of the invention, wherein the pneumatic system comprises a plurality of deposition sources, each of said plurality of deposition sources producing gas at a source pressure PSj different from each of the other source pressures PSj of the other deposition sources.

Method according to the second improvement of the second aspect of the invention, wherein each source pressure PSj is equal to one different deposition pressure PDi.

Method according to the second improvement of the second aspect of the invention, wherein at least one source pressure PSj is greater than the deposition pressure PD, or than each deposition pressure PDi.

Method according to the second improvement of the second aspect of the invention, wherein at least one source pressure PSj is lower than the deposition pressure PD, or than each deposition pressure PDi.

Method according to the second improvement of the second aspect of the invention, wherein the deposition pressure PD, or more of the deposition pressures PDi, of gas injected into the container is obtained by:
- mixing gas from the adjusting source and gas from at least one of the deposition sources, and/or mixing gas from a deposition source and gas from at least one of the other deposition sources, and/or decreasing or increasing the gas pressure from at least one of the deposition sources, and/or increasing gas pressure from the adjusting source.

Method according to the second aspect of the invention, wherein the adjusting source and/or each deposition source is a gas tank storing gas at its respective adjusting pressure and/or source pressure.

Method according to the second aspect of the invention, in which each considered gas tank has a volume at least 5 times, preferably at least 10 times, greater than the sum of the volume of the container and the volume of a gas circuit connecting this considered gas tank to the inlet.

Method according to the second aspect of the invention that may comprise a switching, by a multichannel valve, said switching, control means, of a gas injection from a deposition source or adjusting source towards a gas injection from another deposition source or adjusting source so that produce an instantaneous change of pressure in the container, said multichannel valve being connected to:
the inlet of the container,
at least one of the sources,
a venting system.

Because the tank has a volume at least 5 times greater than the sum of the volume of the container and the volume of a gas circuit connecting this considered tank to the inlet, an instantaneous pressure change in the container is produced during a switching, by the multichannel valve switching, an injection of gas from a deposition source or of adjusting source towards a gas injection from another deposition source or adjusting source.

Method according to the second aspect of the invention, wherein the adjusting pressure PM and the deposition pressure PD, or each of the deposition pressures PDi, may be lower than or equal to 200 kPa above the atmospheric pressure.

Method according to the second aspect of the invention, wherein the adjusting pressure PM may be lower than the atmospheric pressure.

Method according to the second aspect of the invention, wherein adjusting pressure PM and one of the deposition pressures PDi are lower than the atmospheric pressure, and another of the deposition pressures is greater than the atmospheric pressure.

Method according to the second aspect of the invention, wherein the adjusting pressure PM and the deposition pressure PD, or each of the deposition pressures PDi, may be lower than the atmospheric pressure.

Method according to the second aspect of the invention that may comprise a switching, by a multichannel valve, said switching valve, control means, a gas injection from a source towards a gas injection from another source so that produce an instantaneous change of pressure in the container, said multichannel valve being connected to:
the entrance o the container,
at least one of the sources,
a venting system.

Method according to the second aspect of the invention which can comprise:
setting in motion, via a system for driving movement, the container relative to the deposition surface, or conversely, in a plane parallel to the deposition surface, called plane xy, according to a predetermined path, and/o moving away and/or bringing closer, through the system for driving movement, the container relative to the deposition surface, or conversely.

Method according to the second aspect of the invention, which may comprise a control, by a processing unit, of a quantity of material deposited on the deposition surface according to a relative position of the container with respect to said surface by producing:
a modification and/or an adaptation of the relative speed of the container with respect to the deposition surface, or conversely, and/o
a modification and/or adaptation of a distance between the outlet of the container and the deposition surface, and/or
a modification and/or adaptation of the selected deposition pressure PDi.

Deposition method, according to the second aspect of the invention, which may comprise a monitoring of the amount of deposited material and/or the relative position of the container with respect to the deposition surface by means of one or more optical imaging devices imaging a deposition area, and/or an area comprising the outlet of the container, and/or at least a portion of the deposition surface and, depending on this monitoring, a modification and/or an adjusting:
of the gas pressure injected into the container, and/or
of the relative displacement speed of the container with respect to the deposition surface, or conversely, and/or
the distance between the outlet and the deposition surface, and/or
the relative position of the container with respect to the deposition surface.

Deposition method according to the second aspect of the invention, which may comprise a measurement, by a distance sensor and prior to the deposition of the material to be deposited, of a topography of the deposition surface along the predetermined path along which will be deposited the material to be deposited so that, during the deposition, maintain constant a distance enter the outlet of the container and the deposition surface when moving the container according to the predetermined path.

Deposition method according to the second aspect of the invention, which may comprise the steps of:
decreasing, or respectively increasing, by a multichannel pressure regulating valve of the control means, called deposition valve, the gas pressure of a deposition source to an intermediate deposition pressure (PDINT) lower than, or respectively greater than, the source pressure of this deposition source and greater than the pressure PM, and
supplying, via the control means, gas at the pressure PDINT in a portion of a circuit, constituting a deposition source, connecting said deposition valve to the switching multichannel valve said deposition valve, being located, with respect to a gas path extending from the adjusting and deposition sources towards the container, downstream of the deposition source and upstream of said multichannel switching valve.

Method according to the second aspect of the invention, wherein the application of the pressure exerted by the gas on the material to be deposited may be indirect, said application of the pressure being exerted on an element able to slide in the container and placed in contact with the material to be deposited.

Method according to the second aspect of the invention, which may comprise a crosslinking of the material deposited on the deposition surface, and/or a disinfection of the deposition surface by means of a light emitter, the light emitter preferably emitting photons with a wavelength comprises between 150 and 600 nm.

Method according to the second aspect of the invention which may comprise:
- an etching of the deposited material and/or of the deposition surface and/or of a piece comprising the deposition surface, and/or
- a cutting of the deposited material and/or of the deposition surface and/or a piece comprising the deposition surface, and/or
- an annealing of the deposited material.

Method according to the second aspect of the invention, wherein the outlet may be located in a housing containing an atmosphere, said method further comprising a monitoring of the deposition atmosphere comprising:
- a filtration of the atmosphere so as to control a concentration of particles in the atmosphere introduced into the housing, and/or
- sterilization of the atmosphere and/or the deposition area and/or the container and/or the material to be deposited, and/or
- a modification of a hygrometry rate of the atmosphere, and/or
- a change in a deposition temperature.

Method according to the second aspect of the invention, which may comprise a pressure measurement in a part of a gas circuit connecting the multichannel valve to the inlet.

Method according to the second aspect of the invention, which may comprise a step of heating the material to be deposited so as to achieve an extrusion of the material contained in the container.

Method according to the second aspect of the invention, which may comprise an implementation of an additive manufacturing from digital file(s).

Method according to the second aspect of the invention, which may comprise a temperature regulation of the deposition surface.

Method according to the second aspect of the invention, which may comprise a cleaning step of all or part of the container.

Method according to the second aspect of the invention, which may comprise a calculation of the adjusting pressures PM and the deposition pressure PD or the deposition pressures PDi as a function of physico-chemical parameters of the deposited material which forms the meniscus. The features of the deposition are related to these parameters and physico-chemical parameters of the surface.

The deposition device according to the first aspect of the invention may be arranged to implement the method according to the second aspect of the invention.

The method according to the second aspect of the invention may be implemented by the deposition system according to the first aspect of the invention.

BRIEF DESCRIPTION OF THE DRAWINGS

Other advantages and particularities of the invention will appear on reading of the detailed description of implementations and non-limiting embodiments, and the following appended drawings:

FIGS. 1 and 2 are schematic representations of the container,

DETAILED DESCRIPTION

Figure 3:
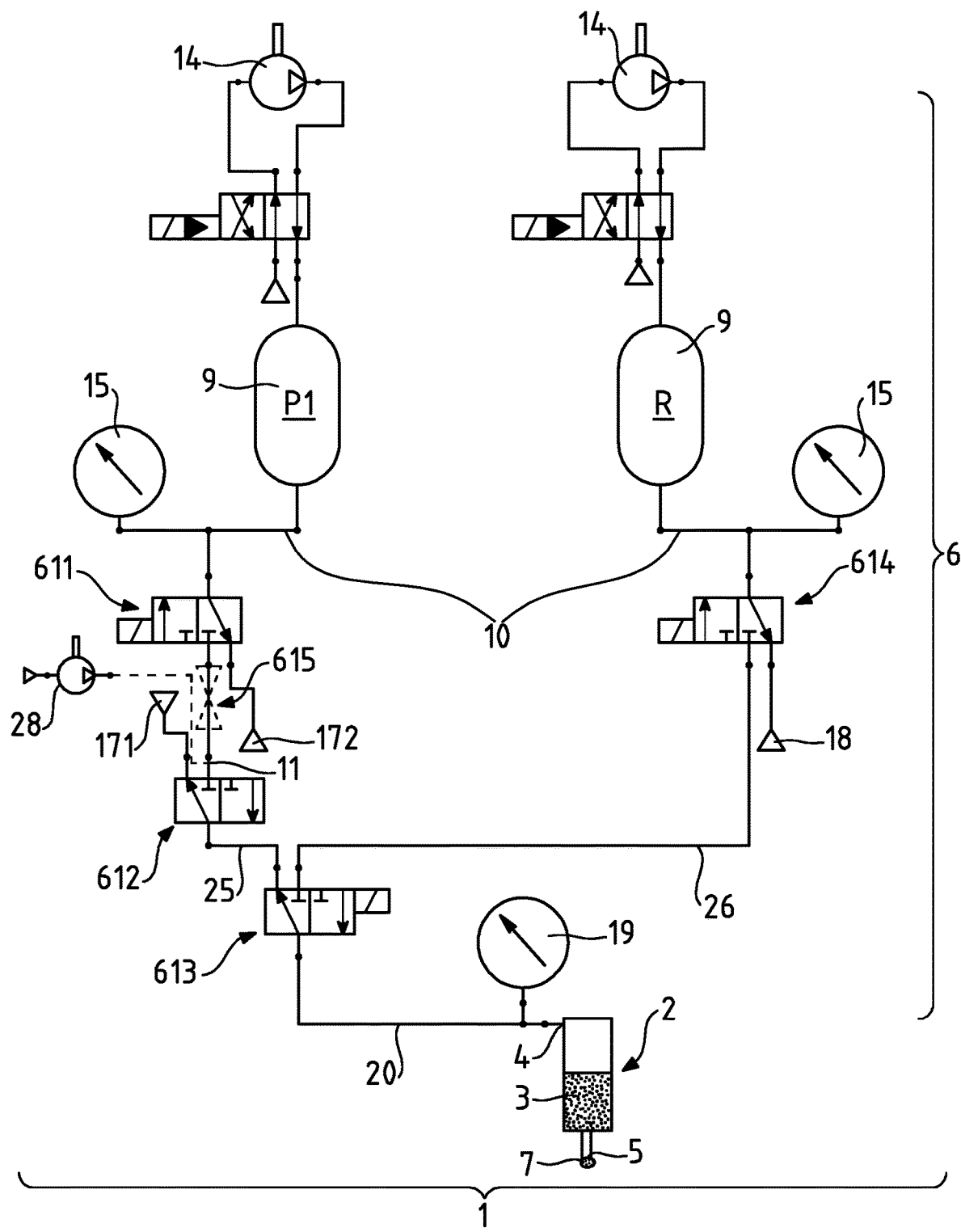
FIG. 3 is a schematic representation of the deposition system according to the invention.

The embodiments described below being in no way limiting, it will be possible to consider variants of the invention comprising only a selection of characteristics described, isolated from the other characteristics described (even if this selection is isolated within a sentence including these other characteristics), if this feature selection is sufficient to confer a technical advantage or to differentiate the invention from the state of the art. This selection comprises at least one characteristic, preferably functional without structural details, or with only a part of the structural details if this part alone is sufficient to confer a technical advantage or to differentiate the invention from the state of the art.

The features described in the embodiments described hereinafter are compatible and may be combined and/or associated with any features of the first embodiment of the deposition system 1 and with any of the alternatives of the first mode provided.

In reference to FIGS. 1, 2, 3, 4 and 5 it is described in a first embodiment, a deposition system 1 comprising a container 2 arranged to contain the material to be deposited 3, the container 2 comprising an inlet 4 and an outlet 5. The deposition system 1 also comprises a pneumatic system 6 arranged to inject, through the inlet 4, the gas into the container 2 so that this gas exerts directly or indirectly, pressure on the material to be deposited 3. The deposition system 1 comprises control means 611, 612, 613, 614, 615 of the pneumatic system 6 arranged to control at least one injection, through the inlet 4, of gas at a adjusting pressure PM, so that a convex meniscus 7 of material to be deposited 3, protrudes from the container 2 to the end of the output 5.

At this point, the meniscus 7 is kept stably formed. A height h of the convex meniscus 7 is between 0 and d/2. The height h of the convex meniscus 7 is adapted as a function of the viscosity of the material to be deposited 3, a speed of displacement of containing 2 regarding to the deposition area 23 and the deposition method used. The height of the convex meniscus 7 corresponding to the distance separating a plane 81 comprising an orifice (not shown) of outlet 5 of the material to be deposited 3 and a plane 82 comprising one end of the convex meniscus 7 situated on the side of the deposition surface 23; d is the maximum internal diameter of the output orifice 5.

The control means 611, 612, 613, 614, 615 of the pneumatic system 6 are controlled by at least one computer, a central or computing unit, an analogic electronic circuit (preferably dedicated), a digital electronic circuit (preferably dedicated), and/or Microprocessor (preferably dedicated), and/or software means.

The control means 611, 612, 613, 614, 615 of the pneumatic system 6 are also arranged to control one injection or several injections, through the inlet 4, of gas at respectively a deposition pressure PD or several deposition pressures PDi greater than the p adjusting pressure of PM, so that the material to be deposited 3 flows out of the container 2 by the outlet 5.

The deposition system 1 is suitable for any type of additive manufacturing.

The deposition system 1 makes it possible to deposit solid material to be extruded, liquid material with a high viscosity, that is to say a viscosity between 200 and 10,000 centipoises, and low viscosity liquid material, i.e., a viscosity of between 0.1 and 200 centipoises, without having to adapt either the deposition system 1 or the formulation or the composition of the material to be deposited 3.

The deposition system 1 allows contactless deposition of material to be deposited 3. Among the non-contact deposition methods, the deposition system 1 suitable, for example, for deposition of material in the form of a drop (drop-casting or ink-jet type processes), for the deposition method of material in the form of patterns (lines, films, etc.) (processes described as meniscus coating method, jet type ink or extrusion type). The deposition system 1 therefore allows to deposit the material to be deposited 3 on any type of substrate 27 having any type of surface roughness.

It is understood by "non-contact deposition" in the present description, the absence of contact between the container 2, and in particular the output 5 of containing 2, and the deposition surface 23 of substrate 27. Nevertheless, it should be noted that in the state of the art, a deposition in (i) the absence of contact between the container 2 and the deposition surface 23 of the substrate 27 can be considered as a "deposition with contact", this is for example the case of the technique of meniscus coating, whereas, for example for the technique of spotter array, (ii) a deposition with contact between the container 2 and the deposition surface 23 of the substrate 27 can be considered as a "non-contact deposition".

In some cases, the material to be deposited 3 contained in the meniscus 7 is in a different state of the material to be deposited 3 contained in the container 2. It is by example the case when the material to be deposited 3 is extruded. In this case, the material 3 contained in the container 2 may be solid or pasty.

The material to be deposited 3 flows from the container 2 according to a flow, or in an equivalent manner according to a desired flow rate, so as to form a deposition of material conforming to the desired deposition.

It is understood by deposition system 1, an additive manufacturing system 1.

When the control means 611, 612, 613, 614, 615 of the pneumatic system 6 are arranged to control several injections, the gas is injected, through the inlet 4 of the container 2, at several deposition pressures PDi different from each other so that the material to be deposited 3 flows at different speeds out of the container 2 through the outlet 5. The deposition pressures PDi are greater than the adjusting pressure PM. The gas injections into the container 2 are carried out successively.

This makes it possible to deposit quantities of material to be deposited 3, that is to say deposited material thicknesses that can vary from a few nanometers to several microns and/or deposited material widths that can vary from a few tens of nanometers to a few millimeters. This also makes it possible to modify the quantity of deposited material, in order to modify, for example, the shape and/or a dimension of the deposited pattern, being deposited during the same passage.

The control means 611, 612, 613, 614, 615 of the pneumatic system 6 are arranged so as to modify, in particular during the deposition material to be deposited 3, the flow rate of the deposition material 3 out of the container 2. Thus, the control means 611, 612, 613, 614, 615 of the pneumatic system 6 are arranged so that injection of a gas at a deposition pressure PDa caused a flow of a quantity of material to be deposited out of container 2, at a speed Flow Va. The flow velocity Va is different from a flow rate Vb of material to be deposited 3, out of the container 2, for which an injection of a gas into the container 2 at a deposition pressure PDb is realized. In a manner equivalent to a change in the flow velocity, the control means 611, 612, 613, 614, 615 of the pneumatic system 6 may be arranged in such a way as to modify a flow and/or a flow rate of material to be deposited 3, or respectively flows and/or flow rates of material to be deposited. 3.

An increase in the flow rate of material to be deposited 3 or the flow of material to be deposited 3 or the flow rate of material to be deposited 3 causes an increase in thickness and/or width of the deposition.

In the case of existing deposition systems, a deposition of a given quantity of material limited to one choice is made within a predefined and limited quantity of material range. The deposition system 1 according to the invention allows the material to be deposited 3 to flow continuous, that is to say without stopping, without interruption as the container 2 contains the material to be deposited 3 and as a deposition pressure PD, PDi is applied.

The system pneumatic 6 of the deposition system 1 comprises a source R, called adjusting source, arranged for produce gas at the adjusting pressure PM and comprises a source P1 or several sources Pi, called deposition source, arranged to produce gas at a source pressure PS or at several source pressures PSj. PS source pressure or PSj source pressures are at least 1,01 times, or at least 1,015 times, greater than the adjusting pressure PM. These values correspond to the deposition of material to be deposited 3 having a low viscosity (0.1 and 1000 centipoises). This value increases when the viscosity of the material to be deposited 3 increases. When the viscosity of the material to be deposited 3 is high (200 and 10,000 centipoises), the source pressure PS or the pressures from sources PSj are, by way of non-limiting example, at least 5 times, or even at least 10 times, higher than the adjusting pressure PM. In the case of extrusion deposition, the source pressure PS or the source pressures PSj are, by way of non-limiting example, at least 10 times, or even at least 100 times, greater than the adjusting pressure PM.

A source P1, Pi, R can be understood as being a container 9 comprising gas at a given pressure. A source P1, Pi, R can be understood as being a pump 14 arranged to compress gas or to suck gas. A source P1, Pi, R can be understood as being a conduit 10, 11, 20, 25, 26 comprising gas at a given pressure. A source P1, Pi, R can be understood as being an assembly comprising, inter alia, a container 9, a pump 14, a conduit 10, 11, 20, 25, 26 an air release system 171, 172 18. Pump 14 is a diaphragm pump.

Thus, according to the intended application, each source P1, Pi, R of the deposition system 1 is arranged to modify at any time and/or in real time and/or during deposition, its source pressure or PS, PSj and/or its adjusting pressure PM by means of the pump 14.

For example, the adjusting source R whose gas contains has a adjusting pressure PM can see the pressure of its modified gas:

at a source pressure PS, PSj, and consequently become, temporarily or permanently, a source of deposition P1, Pi, or at a new adjusting pressure different from the adjusting pressure PM before modification.

Alternatively or additionally, the source pressure PS of the gas contained in a deposition source P1 or source pressures PS, PSj contained in deposition sources P1, Pi, can see the, one, or the gas pressures modified:

at the adjusting pressure PM or at a new adjusting pressure which differ to other adjusting pressure PM of the adjusting source R before modification, at a new source pressure or at source pressures which are identical in part or each different of the source pressures PS, PSj before modifications.

In view of the material to be deposited 3 generally used, the adjusting pressure PM and the deposition pressure PD, or each of the deposition pressures PDi, are less than or equal to 200 kPa above the atmospheric pressure.

Throughout the present description, the pressures are defined in a relative way. In practice, the pressure measurement systems (15, 19) of the deposition system 1 are based, as reference, on atmospheric pressure. Thus, the values of pressures, and in particular the value of the pressure (PM, PD, PDi) of the gas injected into the container 2 is defined in a relative way to the atmospheric pressure.

Thus, when the atmospheric pressure is known, all the pressures can be defined absolutely (in the non-relative way). For example, for an atmospheric pressure of 100 kPa, when a gas is injected into the container 2 at a deposition pressure (PD, PDi), or a relative adjusting pressure PM of 100 kPa above atmospheric pressure, the gas injected into the container 2 thus has a deposition pressure (PD, PDi), or adjusting pressure PM, absolute of 200 kPa.

When the material to be deposited 3 is very slightly viscous (between 0,1 and 1000 centipoises), the adjusting pressure PM can be lower than the atmospheric pressure so that the material to be deposited 3, having a viscosity such that it should be flow, out of the container 2, if the pressure PM was equal to or greater than the atmospheric pressure, forms the convex meniscus 7 and does not flow. In some cases, only the adjusting pressure PM is below atmospheric pressure. In other cases, the adjusting pressure PM and the deposition pressure PD, or each of the deposition pressures PDi, are lower than the atmospheric pressure.

In practice, for a material to be deposited 3 whose viscosity is ranging from 0.1 to 1000 centipoises, the deposition pressure PD, or each of the deposition pressures PDi, are, as a general rule, between 10 kPa below atmospheric pressure and 200 kPa above the atmospheric pressure. This pressure is a function of the speed of movement of the container 2.

A person skilled in the art will understand that when the deposition pressure PD, or the adjusting pressure PM, is lower than the atmospheric pressure, the volume 12 of the container 2 into which the gas from the adjusting source R and/or is injected of deposition source P1 or deposition sources Pi are under partial vacuum. This highlights that when the deposition pressure PD, or the adjusting pressure PM, is lower than atmospheric pressure, the gas injected into the container 2, from the adjusting source R and/or deposition source P1 or deposition sources Pi, exerts a force to oppose the gravity's effect on the material to be deposited 3 so that it does not flow out of the container 2. Similarly, the person skilled in the art understand that when the deposition pressure PD, or the adjusting pressure PM is lower than atmospheric pressure, the volume 12 of the container 2 into which is injected the gas from adjusting source R and/or of the deposition source P1 or deposition sources Pi create a depression in the container 2 to counteract the gravity's effect on the material to be deposited 3 so that it does not flow out of the container 2.

As example, for a diameter of an outlet orifice 5 of the container 2 of 100 μm and when the material to be deposited 3 will be liquid and has viscosities greater than 5000 centipoises or when the material to be deposited 3 will be a paste or when the material to be deposited 3 will be a solid material to be extruded, the deposition pressure PD or deposition pressures PDi are greater than the atmospheric pressure.

Conversely, for a diameter of the outlet orifice 5 of the container 2 of 100 μm and when the material to be deposited 3 will be liquid and present of the viscosities lower than 1000 centipoises, the deposition pressure PD or deposition pressures PDi are lower than the atmospheric pressure.

According to a first alternative of the first embodiment of the deposition system 1 as illustrated in FIG. 3, the pneumatic system 6 comprises a single deposition source P1.

According to the first alternative of the first embodiment:

the source pressure PS and the adjusting pressure PM are greater than the atmospheric pressure, or the source pressure PS and the adjusting pressure PM are lower than the atmospheric pressure, or the source pressure PS is greater than the atmospheric pressure and the adjusting pressure PM is lower than the atmospheric pressure.

According to the first alternative of the first embodiment, and when the deposition pressure PD or deposition pressures PDi are greater than the atmospheric pressure, the source pressure PS is greater than the deposition pressure PD or at least one of the deposition pressures PDi. In this particular case, the source P1 containing of gas at the source pressure PS is considered to be the only deposition source P1 and a pump 28 can be connected to the gas circuit, in order to compress gas in a gas circuit located downstream of the source P1 and upstream of the reactor inlet 4 of the container 2 with respect to the gas path extending from the adjusting sources R and deposition source P1 to the container 2. In this case, the pump 28 may be connected, for example, to the gas circuit 11.

Preferably, when the deposition pressure PD or deposition pressures PDi are greater than atmospheric pressure, the source pressure PS is greater than the deposition pressure PD or each deposition pressure PDi.

More preferably, when the deposition pressure PD or deposition pressures PDi are greater than the atmospheric pressure, the source pressure PS is greater than or equal to a deposition pressure PDsup which is greater than all the others deposition pressures PDi.

According to the first alternative of the first embodiment, and when the deposition pressure PD or deposition pressures PDi are lower than the atmospheric pressure, the source pressure PS is lower at the deposition pressure PD or at least lower to one of the deposition pressures PDi. In this particular case, the source P1 containing gas at the source pressure PS is considered to be the only deposition source P1 and a pump 28 can be connected to the gas circuit, in order to compress gas in a gas circuit downstream of source P1 and upstream of entry 4 of container 2 in relation to the path of gas extending from the adjusting sources R and deposition source P1 to the container 2. In this case, the pump 28 can be connected, for example, to the gas circuit 11.

Preferably, when the deposition pressure PD or deposition pressures PDi are lower to the atmospheric pressure, the source pressure PS is lower to the deposition pressure PD or at each deposition pressure PDi.

More preferably, when the deposition pressure PD or deposition pressures PDi are lower than the atmospheric pressure, the source pressure PS is lower than or equal to a deposition pressure PDinf which is lower than all other deposition pressures PDi.

Preferably, according to the first alternative of the first embodiment, the source pressure PS is greater than or equal to a deposition pressure PDsup which is greater than all the other deposition pressures PDi and the adjusting pressure PM is lower than a deposition pressure PDinf which is lower than all other deposition pressures PDi.

According to the first alternative of the first embodiment, the source pressure PS is equal to the deposition pressure PD, or to one of the deposition pressures PDi.

According to the first alternative of the first embodiment, the pneumatic system 6 is configured such that the deposition pressure PD, or several of the deposition pressures PDi, of gas injected into the container is obtained by decreasing or increasing the gas pressure from the deposition source P1.

As a non-limiting example and with reference to the first alternative to the first embodiment of the deposition system 1, as shown in FIG. 3, an arrangement of the control means 611, 612, 613, 614, 615 that allows the gas mixture, as well as decreasing and increasing the pressure of gas.

For this purpose, the control means 611, 612, 613, 614, 615 of the deposition system 1 comprise a multichannel pressure regulating valve, called deposition valve, 615 which allows to increase or decrease the gas 'pressure coming from the source P1. This deposition valve 615 is located, with respect to a gas' path extending since the adjusting sources R and deposition source P1 to the container 2, downstream of the deposition source P1 and upstream of a multichannel valve, called switching valve, 613. This deposition valve 615 is arranged for:
- when the source pressure PS is greater than the atmospheric pressure, decrease the gas' pressure PS of the deposition source P1 to an intermediate deposition pressure (PDINT) lower than the source pressure PS and higher than the adjusting pressure PM (in this case, the source pressure PS is greater than the deposition pressure PD or at each pressure deposition PDi), or
- when the source pressure PS is lower than the atmospheric pressure, increase the gas' pressure PS from the deposition source P1 to an intermediate deposition pressure (PDINT) greater than the source pressure P1 and greater than the adjusting pressure PM (in this case, the source pressure PS is lower than the deposition pressure PD, or at least one of the deposition pressures PDi or each deposition pressure PDi). The control means 611, 612, 613, 614, 615 are arranged to deliver gas to the pressure PDINT in a part of a circuit 11, constituting a deposition source connecting the deposition valve 615 to an additional multichannel switching valve 612.

According to the first embodiment of the deposition system 1, the control means 611, 612, 613, 614, 615 of the deposition system 1 comprise a multichannel valve, called a switching valve, 613 connected to:
  the inlet 4 of the container 2,
  at least one of the deposition sources P1, Pi and at the adjusting source R,
  a venting system 171.

The multichannel valve 613 is arranged to switch from an injection of gas from a deposition source P1, Pi or adjusting source R to an injection of gas from another deposition source P1, Pi or of adjusting source R or conversely, so as to make an instantaneous pressure change in the container 2.

It is understood by instantaneous pressure change, a pressure change such as:
  the variation in thickness and/or width of the deposition is clear, that it highlights that the design does not have a thickness and/or width gradient, when the switching valve 613 switches from a deposition pressure PD, PDi to another pressure PDi,
  a net and precise stop of the deposition and a desired and fixed height h of the convex meniscus 7 are obtained when the switching valve 613 switches from a deposition pressure PD, PDi towards the adjusting pressure PM,
  a net and accurate deposition is obtained after a start or a deposition's recovery or projection, when the switching valve 613 switches from the adjusting pressure PM to a deposition pressure PD, PDi.

According to the first alternative of the first embodiment of the deposition system 1, the switching valve 613 is connected to a venting system 171 via the additional switching multichannel valve 612.

An additional switching multichannel valve 614 is located between the adjusting source R and the switching valve 613. This multichannel valve 614 makes it possible, among other things, to inject air at atmospheric pressure from a venting system 18 connected to the multichannel valve 614, or to be a part of the multichannel valve 614, in a gas circuit 10 connecting the adjusting source R to the additional switching valve 614; and thus allows to vent the adjusting source R.

The additional multichannel switching valve 614 allows also to inject gas at the adjusting pressure PM into a gas circuit 26.

The additional switching multichannel valve 612 is located between the deposition source P1 and the switching valve 613, and in particular between the deposition valve 615 and the switching valve 613. This multichannel valve 612 allows, among other things, to inject from air at atmospheric pressure from a venting system 171 connected to the multichannel valve 612, or to be a part of the multichannel valve 612, in a gas circuit 25 connecting the additional switching valve 612 to the switching valve 613; and therefore allows to vent the container 2.

The additional switching multichannel valve 612 allows also to inject gas into the gas circuit 25 at the source pressure PS, at the deposition pressure PD or at an intermediate deposition pressure (PDINT).

An additional multichannel switching valve 611 is located between the deposition source P1 and the switching valve 613, and in particular between the deposition source P1 and the deposition valve 615. This additional switching valve 611 allows, among other things, to inject air at atmospheric pressure from a 172 venting system connected to the multichannel valve 611, or forming part of the multichannel valve 611, in a gas circuit 10 connecting the deposition source P1, Pi to the multichannel valve 611; and therefore allows to vent the deposition source P1.

The multichannel additional switching valve 611 allows also to inject gas into the gas circuit 11 at the source pressure PS, at the deposition pressure PD or at an intermediate deposition pressure (PDINT).

According to the first alternative of the first embodiment of the deposition system 1, when the gas injected into the container 2, through the inlet 4, is at the adjusting pressure PM, in other words the switching valve 613 connects the gas circuit 26 to the gas circuit 20, a switching, by the switching valve 613, from a gas' injection from the gas circuit 26 to a gas' injection from the gas circuit 25 will allow to:
  to inject, through the inlet 4, into the container 2, gas at the atmospheric pressure, or
  to inject, through the inlet 4, into the container 2, gas at the deposition pressure PDINT, or
  to inject, through the inlet 4, into the container 2, gas at the source pressure PS.

According to the first alternative of the first embodiment of the deposition system 1, when the gas injected into the container 2, via the inlet 4, is at the pressure PDINT, at the source pressure PS or at the atmospheric pressure, otherwise says that the switching valve 613 which connects gas' circuit 25 to the gas circuit 20, a switching, by the switching valve 613, of a gas injection from the gas circuit 25 to a gas' injection from the gas circuit 26 will inject gas at the adjusting pressure PM, by the inlet 4, in the container 2.

A multichannel valve can be any type of valve known to those people skilled in the art, such as for example any type of controlled solenoid valve type.

According to the first embodiment of the deposition system 1, the adjusting source R and/or each deposition source P1, Pi is a tank 9 which stores gas at its respective adjusting pressure PM and/or deposition source PD, PDi. The tank) is an aluminum cylinder having an inner volume of approximatively one liter, for example 0.7 liter.

Each considered tank 9 presents a volume at least 5 times greater than the sum of the volume of the container 2 and the volume of the gas' circuit 10, 11, 20, 25, 26 connecting the considered tank 9 at the inlet 4. In this case, the variations of the gas' volume in the tank 9 are negligible compared to the gas volume variations contained in the container 2 and in the gas circuit 10, 11, 20, 25, 26 connecting the tank 9 considered at entry 4. This presents the effect to keep constant the exercised pressure by the gas injected into the container 2 onto the material to be deposited 3 contained in the container 2 regardless of the volume of material to be deposited 3 contained in the container 2, and/or when the volume of material to be deposited 3 contained in the container 2 varied. This feature allows improving the deposition quality, particularly when starting, resuming, projecting and stopping the deposition. This characteristic allows obtaining an homogeneous and constant material deposition independently of the quantity of material to be deposited 3 remaining in the container 2.

With reference to FIG. 3, each tank 9 of the pneumatic system 6 is connected to:
  pumps 14 arranged for pumping (or sucking) a gas from each tank 9, P1, Pi, R and/or compressing a gas in each tank 9, P1, Pi, R,
  a pressure measuring system 15.

The pressure measuring system used is preferably a piezo resistive gauge.

Pumping (or sucking) a gas means that a pump 14 is arranged to create a partial vacuum in the tank 9, P1, Pi, R.

The combined effects of:
  the switching valve 613, which is arranged to switch from a gas' injection from a deposition source P1, Pi or from a adjusting source R towards a gas' injection from another deposition source P1, Pi or adjusting source R, and
  The volume of the tank 9, which has a volume at least 5 times greater than the sum of the volume of the container 2 and the volume of a gas circuit 10, 11, 20, 25, 26 connecting the tank 9 considered to the entry 4; improved the instant instantaneous change of pressure in the container 2.

As the tanks 9, P1, Pi and 9, R have a volume at least 5 times greater than the sum of the volume of the container 2 and the volume of the gas' circuit 10, 11, 20, 25, 26 connecting each of these tanks 9, P1, Pi and R at the entry 4, the transition:
  from a deposition pressure PD, PDi towards the adjusting pressure PM in the container 2, generates a net and precise stop of the deposition, and
  from the adjusting pressure PM to a deposition pressure PD, PDi a start, or recovery, net and accurate of the deposition,
  from a deposition pressure PD, PDi to another of the deposition pressures PDi, generates a net variation in thickness and/or in width, without gradient.

The deposition system 1 comprises a system for driving movement (not shown) arranged to move the container 2 relative to a deposition surface 23, or vice versa, in a plane parallel to the deposition surface 23, said plane xy, in a predetermined path. The system for driving movement relatively moves away and/or brings the container 2 closer to the deposition area 23, or conversely. The system for driving movement can be any type of system known to those people skilled in the art such as, by way of non-limiting example, an articulated arm, a tilting platform, a stepper motor, a rail guidance system, a 3-axis positioning system.

The deposition system 1 comprises a programmed treatment unit and/or configured to control the quantity of material deposited on the deposition surface 23 as a function of a relative position of the container 2 with respect to said surface 23 by operating in a combined or separate manner:
  a modification and/or adaptation of the relative speed of the container 2 with respect to the deposition surface 23, or conversely,
  a modification and/or adaptation of a distance between the outlet 5 of the container 2 and the deposition surface 23,
  a modification and/or adaptation of the deposition pressure PD, PDi selected.

Those skilled in the art will understand that the flow velocity of the material to be deposited 3 or the flow of material to be deposited 3 or the flow rate of material to be deposited 3 leads to an increase in the thickness and or in the width of the deposition for a given motion speed of the container 2.

The flow velocity of the material to be deposited 3 varies according to:
  the motion speed of the container 2, and/or
  the type of material to be deposited 3, and/or
  the distance between the outlet 5 of the container 2 and the deposition surface 23, and/or
  deposition pressure PD, PDi.

All the aspects, described above, related to the system for driving movement make it possible to proceed, with the same deposition system, the deposition of material in the form of dot matrix and in the form of patterns.

The processing unit comprises at least one computer, a central processing unit or an analog electronic circuit (preferably dedicated), a digital electronic circuit (preferably dedicated), and/or a microprocessor (preferably dedicated), and/or software means.

The processing unit is programmed and/or configured to control the control means 611, 612, 613, 614, 615 of pneumatic system 6.

The processing unit is programmed and/or configured to control the system for driving movement.

According to the invention, the processing unit is embedded in the deposition system 1 but it may not be part of the deposition system 1. The processing unit comprises a motherboard. It also includes an add-on board and software dedicated to the control of the pneumatic system. It also includes an add-on board dedicated to the control of the system for driving movement.

The processing unit is arranged and/or configured to calculate the adjusting pressures PM and the deposition pressure PD, or the deposition pressures PDi, as a function of physicochemical parameters of the material to be deposited 3. The characteristics of the deposition in terms of shape, size and geometry are a function of these parameters and physicochemical parameters of the deposition area 23.

In practice, a range of deposition pressures PDi will be associated with each material to be deposited 3. This range will be defined according to the type of deposition desired (dimension (s), width (s), type of pattern (s) and/or or drops) and a range of optimal deposition rate. Preferably, the processing unit is arranged and/or configured for controlling the pneumatic system 6 so as to apply adjusting pressure PM and a deposition pressure PD, or successive deposition pressures PDi, depending on a material to be deposited 3 and the type of deposition desired (size (s), width (s), type of pattern (s) and/or drops).

The processing unit is arranged and/or configured to calculate and/or adapting and/or modifying the deposition pressure PD, PDi as a function of the motion speed of the container 2, or vice versa.

By way of non-limiting example, for a material to be deposited 3 whose viscosity is about 100 centipoises, the deposition pressure PD is about 1 kPa above the atmospheric pressure for a low motion speed of the container 2 (equal to or less than 0.5 meters/minute) and 10 kPa above the atmospheric pressure for a high motion speed of the container 2 (3 m/min).

By way of non-limiting example, for a material to be deposited 3 whose viscosity is approximately 5000 centipoises, the deposition pressure PD is about 25 kPa above the atmospheric pressure for a low motion speed of the container 2 (equal to or less than 0.5 meters/minute) and 200 kPa above the atmospheric pressure for a high motion speed of the container 2 (3 m/min).

The deposition system 1 comprises a distance sensor (not shown) arranged for, prior to deposition of the material to be deposited 3, to measure a topography of the deposition surface 23 along the predetermined path in which the material to be deposited 3 will be deposited so at, during depositsion, keep a constant distance between the outlet 5 of the container 2 and the deposition surface 23, or between the plane 82 comprising at its end the convex meniscus 7 located on the side of the deposition surface 23 and the deposition surface 23, during the displacement of the container 2 according to the predetermined path. The distance sensor can be any type of known system of the people skilled in the art such as, a nonlimited example a optical, photoelectric, capacitive, ultrasonic sensor.

The deposition system 1 allows to deposit the material to be deposited 3 on any type of substrate 27 having any type of topography.

With reference to FIG. 2, the deposition system 1 comprises a suitable element to slide 13 in the container 2 and agency to be in contact with the material to be deposited 3. The element is arranged so as to defer on the material 3 contained in the container 2 the pressure exerted by the gas 12 on the element 13.

According to the first embodiment, the slidable element 13 in the container 2 is, by way of non-limiting example, a piston 13.

The piston 13 is arranged upstream, with respect to the gas path extending from the adjusting sources R and deposition source P1, Pi to the container 2, of the material to be deposited 3.

The deposition system 1 comprises a pressure measuring system 19 for measuring a pressure in a part of a gas circuit 20 connecting the multichannel valve 613 to the inlet 4. The pressure measuring system 19 therefore measures the gas' pressure contained in the volume 12 of the container 2 which is in contact with the material to be deposited 3.

With reference to FIG. 1, the container 2 is removable and comprises a fastening system 22 of the container 2 to the part of the gas circuit 20 connecting the multichannel valve 613 to the inlet 4. The container 2 is preferably made of polymer, for example polypropylene, and has an interior volume of a few milliliters, for example 3, 5 or 10 ml.

With reference to FIGS. 1, 2, 3, 4 and 5, according to a second embodiment of the invention, there is described a deposition method implemented in a deposition system, the deposition system comprising:
  a container 2 in which there is material to be deposited 3 and comprising an inlet 4 and an outlet 5,
  a pneumatic system 6 comprising control means 611, 612, 613, 614, 615 of the pneumatic system 6. The method is characterized in that the pneumatic system 6 injects, through the inlet 4, gas into the container 2 so that this gas exerts, directly or indirectly, a pressure on the material to be deposited 3. The method comprises a control, by the control means 611, 612, 613, 614, 615 of the pneumatic system 6:
  of an injection, through the inlet 4, of gas at a adjusting pressure PM, so that a convex meniscus 7 of material to be deposited 3 protrudes from the container 2 at the outlet 5, and then
  at least one injection, through the inlet 4, respectively at a deposition pressure PD, or at several deposition pressures PDi, greater than the adjusting pressure PM, so that the material to be deposited 3 flows out into a material deposition area from the container 2 through the outlet 5 on a deposition surface 23.

The deposition method according to the second aspect of the invention allows the deposition of material according to any type of deposition technique known to those people skilled in the art (drop casting, inkjet, meniscus coating, extrusion).

Any feature of the deposition system 1 according to the first embodiment can be integrated into the deposition system 1 in which the method according to the second embodiment is implemented.

The features described in the first embodiment, including features described as alternatives of the first embodiment, are compatible and may be combined and/or associated with any features of the deposition system 1 in which the method according to second embodiment is implemented.

The method comprises a control, by the control means 611, 612, 613, 614, 615 of several injections, through the inlet 4, of gas at several deposition pressures PD, PDi different from each other, so that the material to be deposited 3 flows out at different speeds except from the container 2 through the outlet 5. The deposition pressures PD, PDi are greater than the adjusting pressure PM.

The several injections, through the inlet 4, of gas at several deposition pressures PD, PDi different from each other are successively made to each other.

Figure 4:
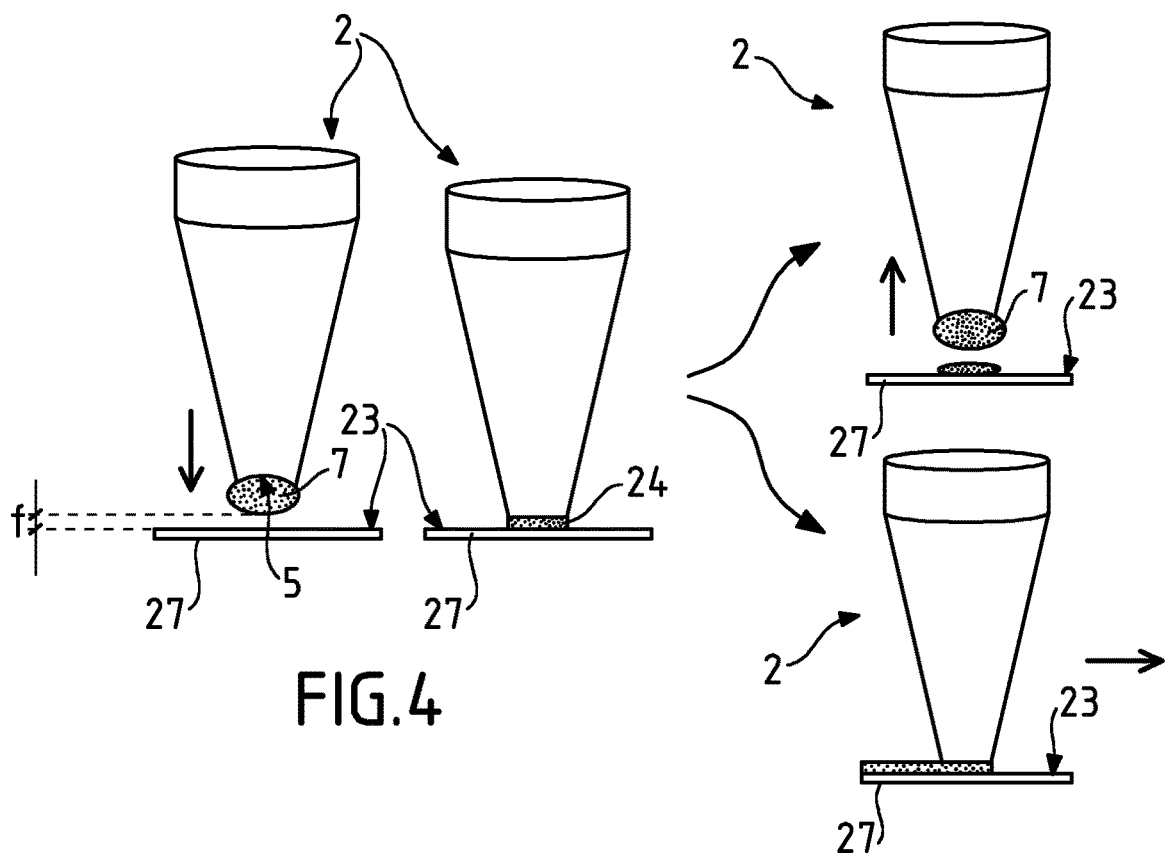
FIG. 4 is a diagrammatic representation of dot deposition and/or of patterns by a capillary bridge establishment between the container and the deposition surface.

With reference to FIG. 4, the method comprises, between the injection of gas at the adjusting pressure PM and at least at one gas injection at the deposition pressure PD, or at the deposition pressures PDi, a decrease of a distance f between the meniscus 7 and the deposition area 23 until the formation of a capillary bridge 24 between said deposition surface 23 and the meniscus 7. The method also comprises, subsequent to forming the capillary bridge 24, the at least one gas injection at the deposition pressure PD, or at the deposition pressures PDi. This allows to the material to be deposited 3 flow out of the container 2. Subsequent to the at least one injection of gas at deposition pressure PD, or deposition pressures PDi, the method includes a new injection of gas to the adjusting pressure PM to ensure that the material to be deposited 3 no longer flows from container 2. Subsequent to the new gas injection at the adjusting pressure PM, an increase of the distance f between the meniscus 7 and the deposition area 23 until the break of the capillary bridge 24 between the deposition surface 23 and the meniscus 7.

In some cases, depending on the surface state of the deposition surface 23 and the surface tensions (spread coefficient), subsequent to the formation of the capillary bridge but prior to by injecting gas at the deposition pressure PD, or at the deposition pressures PDi, the capillary bridge can be broken spontaneously.

Figure 5:
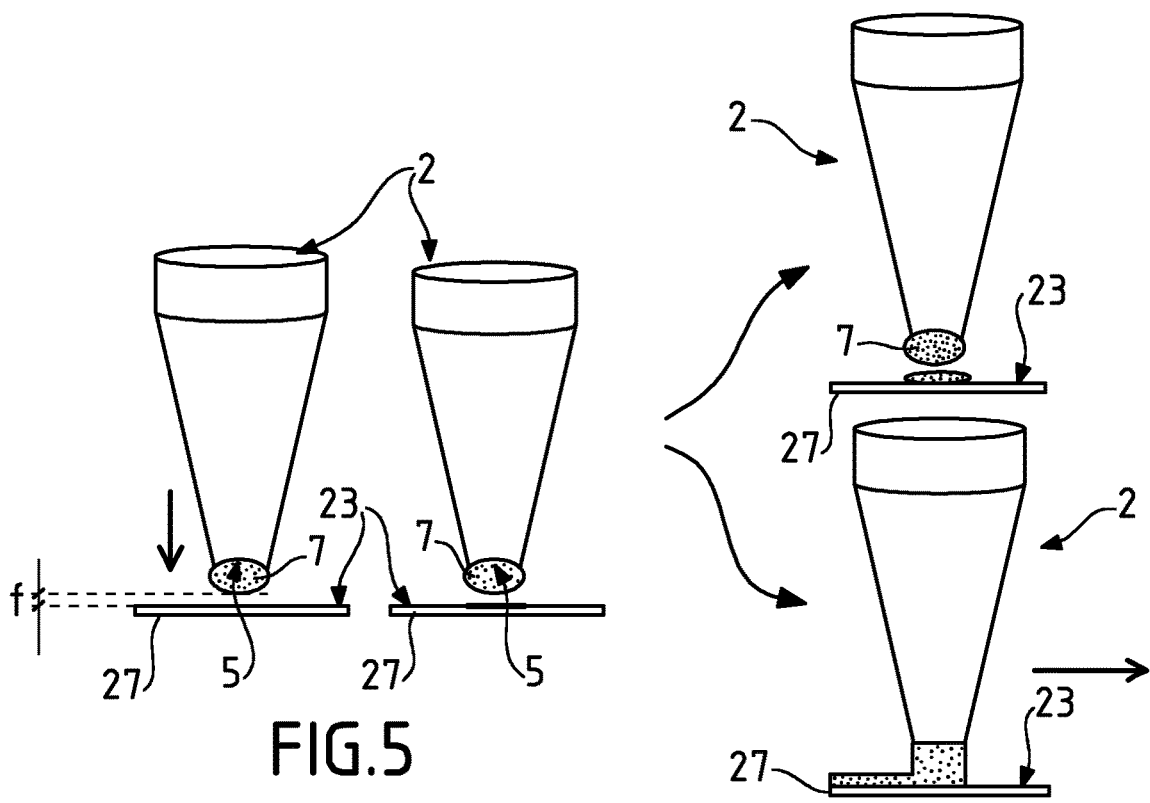
FIG. 5 is a diagrammatic representation of dot deposition and/or patterns without capillary bridge establishment between the container and the deposition surface.

According to an alternative, and with reference to FIG. 5, the method comprises, between the injection of gas at the adjusting pressure PM and the at least one injection of gas at the deposition pressure PD, or at the deposition pressures PDi, a decrease, to a desired distance f between the meniscus 7 and the deposition surface 23 (without capillary bridge formation 24). The method also comprises at least one gas' injection at the deposition pressure PD or at the deposition pressures PDi so that the material to be deposited 3 flows out, for example in the case of a deposition by extrusion technique, or is projected, for example in the case of an ink jet deposition, of the container 2 towards the deposition surface 23. Subsequently to the at least one injection of gas at the deposition pressure PD, or deposition pressures PDi, the method comprises a new injection of gas at the adjusting pressure PM in order to the material to be deposited 3 no longer flows out from the container 2.

The method according to the second embodiment is implemented in a deposition system 1 in which the pneumatic system 6 comprises a source R, called adjusting source, producing gas at the adjusting pressure PM and at least one source P1, Pi, called deposition source, producing gas at a source pressure PS, or at several source pressures PSj, preferably at least 1.01 times, more preferably at least 1.015 times, greater than the adjusting pressure PM.

Depending on the intended application, the method may include a modification at any time and/or in real time and/or during deposition, of the source pressure PS, PSj and/or of the adjusting pressure PM of each source P1, Pi, R of the deposition system 1.

For example, the method may comprise a modification of the adjusting pressure PM of the adjusting source R:
 to a source of pressure PS, PSj, and therefore become temporarily or permanently, a deposition source P1, Pi, or
 at a new adjusting pressure different from the adjusting pressure PM before modification.

In an alternative or complementary way, the method can comprise a modification of the source pressure PS of the gas contained in a deposition source P1 or of source pressures PS, PSj of gas contained in deposition sources P1, Pi:
 at the adjusting pressure PM or at a new different adjusting pressure PM of the adjusting source R before modification,
 at a new source pressure or source pressures being partly identical or each different from the source pressures PS, PSj before modifications.

The method according to the second embodiment is implemented in a deposition system 1, in which the pneumatic system 6 comprises a single deposition source P1.

In this case, the source pressure PS can be:
 greater than the deposition pressure PD, or at least one of the deposition pressures PDi, or less than the deposition pressure PD, or at least one of the deposition pressures PDi, or
 equal to the deposition pressure PD, or to one of the deposition pressures PDi.

When the deposition pressure PD or of the deposition pressures PDi are higher than the atmospheric pressure, the source pressure PS is greater than the deposition pressure PD or at each deposition pressure PDi. Preferably, the source pressure PS is greater than or equal to a deposition pressure PDsup which is greater than all the other deposition pressures PDi.

When the deposition pressure PD or deposition pressures PDi are below the atmospheric pressure, the source pressure PS is lower than the deposition pressure PD or at each deposition pressure PDi. Preferably, the source pressure PS is less than or equal to a deposition pressure PDinf which is lower than all the other deposition pressures PDi.

The method according to the second embodiment is implemented in a deposition system 1, wherein the pneumatic system 6 comprises several deposition sources P1, Pi, each of said plurality of deposition sources P1, Pi is arranged to produce gas at source pressure PSj which are different from each of the other source pressures PSj of other deposition sources P1, PDi.

In that case:
 each source pressure PSj is equal to a different deposition pressure PDi, or
 at least one source pressure PSj is greater than the deposition pressure PD, or at each deposition pressure PDi, or
 at least one source pressure PSj is less than the deposition pressure PD, or at each deposition pressure PDi.

When the deposition pressure PD or the deposition pressures PDi are above the atmospheric pressure, at least one source pressure PSsup is higher or equal at the deposition pressure PD, or at a deposition pressure d PDsup which is greater than all other deposition pressures PDi.

When the deposition pressure PD or of the deposition pressures PDi are below atmospheric pressure, at least one source pressure PSinf is less than or equal to the deposition pressure PD, or to a deposition pressure PDinf which is lower than all the other deposition pressures PDi.

When a part of the deposition pressures PDi are lower than the atmospheric pressure and another part of the deposition pressures PDi are greater than the atmospheric pressure:
 at least one source pressure PSsup is greater than or equal to a deposition pressure PDsup which is greater than all the other deposition pressures PDi and at least one source pressure PSinf is less than or equal to a deposition pressure PDinf which is lower than all other pressures deposition PDi, or
 at least one source pressure PSsup is greater than or equal to a deposition pressure PDsup which is greater than all the other deposition pressures PDi and the adjusting pressure PM is lower than a deposition pressure PDinf which is lower than at all other deposition pressures PDi.

The method according to the second embodiment is implemented in a deposition system 1 in which the pressure PD, or several of the deposition pressures PDi, of gas injected into the container 2 is obtained by:
 mixture of gases from a deposition source P1, Pi and gas coming from at least one other deposition source P1, Pi, and/or
 decreasing or increasing the gas pressure from at least one of the deposition sources P1, Pi.

The method according to the second embodiment is implemented in a deposition system 1 in which the adjusting source R and/or each deposition source P1, Pi is a tank 9 storing gas at its respective adjusting pressure PM and/or source PSj.

The method according to the second embodiment is implemented in a deposition system 1 in which each tank 9 considered has a volume at least 5 times, preferably at least 10 times, greater than the sum of the volume of the container 2 and the volume of a gas circuit 10, 11, 20, 25, 26 connecting the tank 9 considered at the inlet 4.

The method according to the second embodiment comprises a switch, by a selector valve 613, said switching control means 6, an injection of gas from a deposition source P1, Pi or of adjusting source R towards gas injection from another deposition source P1, Pi or of adjusting source R to operate an instantaneous change of pressure in the container 2. The switching valve 613 is connected to:
   the entrance to the container 2,
   at least one of the sources R, P1, Pi,
   to a venting system 171.

The fact that the tank 9 has a volume at least 5 times greater than the sum of the volume of the container 2 and the volume of gas' circuit 10, 11, 20, 25, connecting the tank 9 considered at the inlet 4, an instantaneous change of pressure in the container 2 is operated during a switching, by the multichannel switching valve 613, of a gas' injection from a deposition source P1, Pi or adjusting source R to a gas injection from another deposition source Pi or adjusting source R.

The method according to the second operating procedure, comprises a setting in motion, by a system for driving movement, the container 2 relative to the deposition surface 23, or vice versa, in a plane parallel to the deposition surface 23, said xy plane, in a predetermined path. Alternative or complementary way, depending on the type of technique of deposition used, the method comprises a remoteness and/or a bringing the container 2 closer to the deposition surface 23 or vice versa.

The method makes it possible to deposit, without contact, the material to be deposited 3 according to several deposition techniques so as to obtain any type of patterns and shapes of deposited material.

With reference to FIGS. 4 and 5, there is illustrated a method for deposition of material in the form of a drop. It can be produced according to the drop casting method in which the meniscus 7 is brought into contact with the deposition surface 23 to form the capillary bridge 24 (FIG. 4) or according to the inkjet-type process in which the drop is projected onto the deposition surface 23 from the container 2 (from the meniscus 7) by applying a deposition pressure PD, PDi without prior formation of the capillary bridge 24 (FIG. 5).

With reference to FIG. 4, there is illustrated a deposition method without contact in which the meniscus 7 is in contact with the deposition area 23 to form the capillary bridge 24. According to this method (meniscus coating type), the material to be deposited 3 is deposited in the form of patterns (lines, films, points). This method is suitable for depositing any type of liquid material or pastes.

With reference to FIG. 5, there is illustrated a non-contact method according to which the material to be deposited 3 flows out from the container 2 without the formation of a capillary bridge 24 beforehand. According to this type of process (inkjet type, formation of beads or extrusion), the material to be deposited 3 is filed in form of patterns (lines, films, dots . . . ). This method ess is suitable for depositing any type of gels, pastes or solids.

The deposition system 1 can deposit material to be deposited 3 on any type of substrate 27 having any type of roughness.

The method according to the second embodiment, comprises a control, by a processing unit, of material quantity deposited on the deposition surface 23 as a function of a relative position of the container 2 with respect to said surface 23 while operating:
   a modification and/or adaptation of the relative speed of the container 2 to the deposition surface 23, or vice versa, and/or
   a modification and/or adaptation of a distance between the outlet 5 of the container 2 and the deposition surface 23, and/or
   a modification and/or adaptation of the deposition pressure PDi selected.

The method according to the second embodiment comprises a control, by the processing unit, of the amount of material deposited and/or the relative position of the container 2 with respect to the deposition surface 23 with several optical imaging devices to image a deposition zone, and/or an area comprising the outlet 5 of the container 2, and/or at least a part of the deposition surface 23. According to this control by the unit treatment, a modification and/or an adjustment of:
   the gas pressure injected into the container 2, and/or
   the speed of relative displacement of container 2 compared to the deposition surface 23, or vice versa, and/or
   the distance between the outlet 5 and the deposition surface 23, and/or
   the relative position of the container 2 with respect to the deposition surface 23.

According to the embodiment, the deposition system 1 comprises a Endoscopic type camera (a CMOS sensor associated with a lens having a focal length of 28 mm) fixed on the container 2 and arranged to permanently image the outlet 5 of the container 2 and/or the deposition surface 23.

According to the embodiment, the filling system 1 also comprises a side camera (an associated CMOS sensor at a lens having a focal length of 16 mm) fixed with respect to the substrate 27 and arranged to measure a drop angle formed between the meniscus 7 of material to be deposited 3 and the outlet 5 of the container 2.

The method according to the second embodiment comprises a measuring method, by a distance sensor and prior to the deposition of the material to be deposited 3, a topography of the deposition surface 23 along the predetermined path in which the material to be deposited 3 will be deposited. The measure of this topography allows, during the deposition, to maintain by the processing unit, a constant distance between the outlet 5 of the container 2 and the deposition surface 23 during the displacement of the container 2 according to the predetermined path.

The method according to the second embodiment, comprises:
   a decrease, or an increase respectively, by a multichannel pressure regulating valve 615, called the deposition valve, of the control means 611, 612, 613, 614, 615 of the deposition system 1, the pressure PS, PSj gas from a deposition source P1, Pi until an intermediate deposition pressure PDINT lower, or respectively higher, than the source pressure PSj of this deposition source P1, Pi and greater than the adjusting pressure PM. The method comprises the step of delivering, by the control means 611, 612, 613, 614, 615, some gas at the pressure PDINT into a part of a circuit 11, constituting a deposition source, connecting said deposition valve 615 to the additional commutation multichannel valve 612.

The deposition valve 615 is located downstream of one or more deposition sources P1, Pi and upstream of said multichannel switching valve 613 with respect to a gas path extending from the adjusting sources R and deposition source P1, Pi to the container 2.

The method according to the second embodiment comprises a pressure measurement in a portion of a gas circuit connecting the multichannel valve 613 to the inlet 4.

The method according to the second embodiment, comprises a calculation of the adjusting pressure PM and the deposition pressure PD or deposition pressures PDi as a function of physicochemical parameters of the material to be deposited 3 which forms the meniscus 7. The characteristics of the deposition in terms of shape, size and geometry are a function of these parameters and physicochemical parameters of the deposition surface 23.

The deposition system 1 in which the method according to the second embodiment is implemented, is the deposition system 1 according to the first embodiment.

The deposition device 1 according to the first embodiment is designed to implement the method according to the second embodiment.

The invention is not limited to the examples that have just been described and many adjustments can be made to these examples without departing from the scope of the invention.

Thus, in mutually combinable variants of previously described embodiments:
- the pneumatic system 6 is removably connected to the inlet 4 of the container 2, and/or
- according to a second alternative of the first embodiment of the deposition system 1, the pneumatic system 6 comprises several deposition sources P1, Pi, each of the several deposition sources P1, Pi is arranged to produce gas at a source pressure PSj different from each of the other source pressures PSj from the other deposition sources P1, Pi, and/or
- according to the second alternative of the first embodiment:
  all of source pressures PSj and the adjusting pressure PM are above the atmospheric pressure, or all of source pressures PSj and the adjusting pressure PM are lower than the atmospheric pressure, or
  a part of the source pressures PSj is greater than the atmospheric pressure, another part of the source pressure PSj is lower than the atmospheric pressure and the adjusting pressure PM is lower than the atmospheric pressure, and/or
- according to the second alternative of the first embodiment:
  each source pressure PSj is equal to a different deposition pressure PDi; in this case each tank 9 can be a source P1, Pi containing gas at a source pressure PSj, different from each other source pressure PSj of each other tank 9, or
  when the deposition pressure PD or deposition pressures PDi are greater than the atmospheric pressure, at least one source pressure PSj is higher at the deposition pressure PD, or at each deposition pressure PDi, or
  when the deposition pressure PD or deposition pressures PDi are greater than the atmospheric pressure, at least a source pressure PSsup is greater than or equal to the deposition pressure PD, or at a deposition pressure of PDsup which is higher at all the other deposition pressures PDi, or
  when the deposition pressure PD or deposition pressures PDi is below the atmospheric pressure, at least a source pressure PSj is smaller than the deposition pressure PD, or each deposition pressure PDi, or
  when the deposition pressure PD or deposition pressures PDi is below the atmospheric pressure, at least a source pressure PSinf is less than or equal to the deposition pressure PD, or to a deposition pressure PDinf which is less than all other deposition pressures PDi, or when a part of the deposition pressures PDi are lower than the atmospheric pressure and another part of the deposition pressures PDi are greater than the atmospheric pressure, at least one pressure of source PSsup is higher or equal at a deposition pressure of PDsup that is greater than all other deposition pressures PDi and at least a source pressure PSinf is less than or equal to a deposition pressure PDinf which is lower than all other deposition pressures PDi, or
  when part of the deposition pressures PDi are lower than the atmospheric pressure and another portion of the deposition pressures PDi are greater than the atmospheric pressure, at least one pressure source PSsup is greater than or equal to a deposition pressure of PDsup which is greater than all other deposition pressures PDi and the adjusting pressure PM is lower than a deposition pressure PDinf which is lower than all other deposition pressures PDi, and/or
  - according to the first alternative of the first embodiment, the pneumatic system 6 is arranged so that the deposition pressure PD, or several of the deposition pressures PDi, of gas injected into the container 2 is obtained by
  mixture of gases from the adjusting source R and gas from the deposition source P1, and/or
  decreasing or increasing the gas pressure from the deposition source P1, and/or
  increasing of the gas pressure from the adjusting source R, and/or
    - according to the second alternative of the first embodiment, the pneumatic system 6 is arranged such that the deposition pressure PD, or several of the deposition pressures PDi, of gas injected into the container 2 is obtained by:
  mixture of gases from the adjusting source R and gas from at least one of the deposition sources P1, Pi, and/or
  mixing gas from a deposition source P1, Pi and gas from at least one of the other deposition sources P1, Pi, and/or
  decreasing or increasing the gas pressure from at least one of the deposition sources P1, Pi, and/or
  increasing the gas pressure from the adjusting source R, and/or
  by way of non-limiting example and with reference to the second alternative of the first embodiment of the deposition system 1, there is described, by way of non-limiting example, an arrangement of the control means 611, 612, 613, 614, 615 permitting gas mixing, as well as decreasing and increasing the gas pressure, and/or
    - according to the second alternative of the first embodiment of the deposition system 1, the control means 611, 612, 613, 614, 615 of the deposition system 1 comprises one or more pressure-regulating multichannel valves, called deposition valves, to increase or decrease the gas' pressure from of the adjusting source R and/or deposition sources P1, Pi; one or more of these deposition valves are located, with respect to a gas path extending from the adjusting source R and depositing sources P1, Pi towards the container 2:
downstream of the adjusting source R,
and/or downstream of each of the deposition sources P1, Pi and upstream of the multichannel valve 613;
this valve or these deposition valves are arranged for:
when the pressure source PM is below the atmospheric pressure, increasing the gas' pressure PM from the adjusting source R to an intermediate deposition pressure PDINT greater than the adjusting pressure PM and less than at least one of the source pressures PSj, or
preferably, when the source pressure PM is lower than the atmospheric pressure, increasing the gas' pressure PM from the adjusting source R to an intermediate deposition pressure PDINT greater than the adjusting pressure PM and lower than each of the source pressures PSj, and/or
when the source pressures PSj are greater than the atmospheric pressure, decreasing one or more gas' pressures PSj from one or more deposition sources P1, Pi up to one or of the intermediate deposition pressures PDINT lower than the source pressure PSj of this deposition source or these deposition sources P1, Pi deposition and greater than the adjusting pressure PM, or
when the source pressures PSj are lower than the atmospheric pressure, increasing one or more gas' pressures PSj or several deposition sources P1, Pi up to a one or several intermediate deposition pressure PDINT above the source pressure PSj of this source or deposition sources P1, Pi and greater than the adjusting pressure PM, or
when the adjusting pressure is lower at 100 kPa and that a first part of the source pressures PSj are lower than the atmospheric pressure and that a second part of the source pressures PSj are greater than the atmospheric pressure:
to increase the gas pressure PM from the adjusting source R to an intermediate deposition pressure PDINT greater than the adjusting pressure PM and lower than each of the source pressures PSj, and/or
to increase one or several gas' pressure PSj from one or more deposition sources P1, Pi in the first part to one or several intermediate deposition pressure PDINT greater to one or several source pressure PSj or from these deposition sources P1, Pi greater than the pressure of adjusting pressure PM, and/or
decreasing a gas' pressure PSj from one or more deposition sources P1, Pi in the second part up to one or several intermediate deposition pressure PDINT lower than the source pressure PSj of this or of these deposition sources P1, Pi and higher at the adjusting pressure PM, and/or
according to the second alternative of the first embodiment of the deposition system 1, the part of the pneumatic system 6 between a deposition source considered among the deposition sources P1, Pi and the switching valve 613 comprises:
one or more additional switching multichannel valves (611, 612, 614) and/or
one or more deposition valves 615, and/or
according to the second alternative of the first embodiment of the deposition system 1, an additional switching multichannel valve allows:
to inject into a gas circuit 26, gas at the adjusting pressure PM and allows to vent the adjusting source R, and/or
to inject into the gas circuit 25, gas at the source pressure PS, PSj, at the deposition pressure PD, PDi or at an intermediate deposition pressure i (PDINT) and allows to vent the container 2, and/or
to inject into the gas circuit 11, gas at the source pressure PS, PSj, at the deposition pressure PD, PDi or at an intermediate deposition pressure (PDINT) and allows to vent considered deposition source, and/or
according to the second alternative of the first embodiment of the deposition system 1, the control means 611, 612, 613, 614, 615 are arranged to deliver gas to the pressure PDINT in a part of a circuit 11, constituting a deposition source, connecting the deposition valve 615 to the multichannel switching valve 612, and/or
according to the second alternative of the first embodiment of the deposition system 1, the control means 611, 612, 613, 614, 615 of the deposition system 1 comprise two deposition valves 615 or more, and/or
according to the second alternative of the first embodiment of the deposition system 1, the control means 611, 612, 613, 614, 615 of the deposition system 1 include two switching valves 613 or more, and/or
according to the second alternative of the first embodiment of the deposition system 1, the control means 611, 612, 613, 614, 615 of the deposition system 1 comprise two deposition valves 615 or more, a deposition valves 615 are connected to a deposition source P1, Pi and another of the deposition valves 615 is connected to another of the deposition sources P1, Pi, and/or
according to the second alternative of the first embodiment of the deposition system 1, the control means 611, 612, 613, 614, 615 of the deposition system 1 comprises two or more deposition valves 615, each of the deposition valves 615 is connected to a different source P1, Pi and each having a pressure greater than the atmospheric pressure, and/or according to the second alternative of first operating procedure of the deposition system 1, the control means 611, 612, 613, 614, 615 of the deposition system 1 comprises two deposition valves 615 or more, each of the deposition valves 615 is connected to a different source P1, Pi and each having a pressure lower than the atmospheric pressure, and/or
according to the second alternative of the first embodiment of the deposition system 1, the control means 611, 612, 613, 614, 615 of the deposition system 1 comprise two deposition valves 615 or more, one of the deposition valves 615 is connected to a deposition source P1, Pi which has a source pressure PSj higher than the atmospheric pressure and another deposition valves 615 is connected to another one of the deposition sources P1, Pi which hays a pressure source PSj lower than the atmospheric pressure, and/or
according to the second alternative of the first embodiment of the deposition system 1, the control means 611, 612, 613, 614, 615 of deposition system 1 include two deposition valves 615 or more, a deposition valves 615 being connected to a deposition source P1, Pi which has a pressure source PSj greater than the atmospheric pressure and another deposition valves 615 being connected to the adjusting source R which has a adjusting pressure PM lower than the atmospheric pressure, and/or according to the second alternative of the first embodiment of the deposition system 1, the control means 611, 612, 613, 614, 615 of the deposition system 1 comprise two deposition valves 615 or more, one of the deposition valves 615 being connected to a deposition source P1, Pi which has a pressure source PSj lower than the atmospheric pressure and another deposition valves 615 being connected to the adjusting source R which has adjusting pressure PM lower than the atmospheric pressure, and/or according to the second alternative of first operating procedure of deposition system 1, the control means 611, 612, 613, 614, 615 of the deposition system 1 comprise more than two deposition valves 615, a deposition valve 615 is connected to a deposition source P1, Pi which has a source pressure PSj greater than the atmospheric pressure, another deposition valve is connected at a deposition source P1, Pi which presents a source pressure PSj lower than the atmospheric pressure, and other deposition valves 615 are connected to the adjusting source R which has a adjusting pressure PM lower than the atmospheric pressure, and/or according to the second alternative of the first embodiment of the deposition system 1, when the gas injected into the container 2, through the inlet 4, is at a deposition pressure PD1, PDINT1, PS1 a switching, by the switching valve 613, of a gas' injection from a gas circuit containing gas at the deposition pressure PD1, PDINT1, PSI considered towards a gas injection from a gas circuit containing gas at another deposition pressure PD2, PDINT2, PS2 will inject, by the inlet 4 in the container 2, the gas at the deposition pressure PD2, PDINT2, PS2, and/or each considered tank 9 has a volume at least 10 times, preferably at least 20 times, more preferably at least 50 times and more preferably at least 100 times greater than the sum of the volume of the container 2 and the volume of a circuit 10, 11, 20, 25, 26 of gas connecting the tank 9 which is at the inlet 4, and/or the deposition system 1 comprises one or more optical imaging devices arranged to image a deposition zone, and/or an area comprising the outlet 5 of the container 2, and/or at least a part of the deposition surface 23, so that the processing unit is arranged to control the amount of deposited material and/or the relative position of the container 2 with respect to the deposition surface 23; according to this control, the processing unit is arranged to modify and/or adjust:

the gas pressure injected into the container 2, and/or the relative motion speed of the container 2 with respect to the deposition surface 23, or vice versa, and/or the distance between the outlet 5 and the deposition surface 23, and/or the relative position of the container 2 with respect to the deposition surface 23, and/or the deposition system 1 comprises a light emitter arranged to emit photons of wavelength between 150 and 600 nm, and/or the deposition system 1 comprises a laser emission system arranged to:

etch the deposition of material and/or the deposition surface 23 carrying the deposition of material and/or a part comprising the deposition surface 23, and/or cut the deposited material and/or the deposition area 23 wearing the deposition of material and/or a part comprising the deposition surface 23, and/or make annealing of the deposited material, and/or the outlet 5 of the container 2 is located in a cabinet which contains an atmosphere, said system further comprises control means said atmosphere, said control means comprising:

an air filtration system arranged to control the particles concentration in the introduced atmosphere into the chamber, and/or a device arranged to sterilize the atmosphere and/or the deposition area and/or the container and/or the material to be deposited, and/or a device arranged to modify the hygrometry rate of the chamber atmosphere, and/or a device arranged to modify the temperature of the chamber, and/or the deposition system 1 comprises an heating element connected to the container 2 and arranged so as to heat the material to be deposited 3 which is inside in the container 2, and/or the heating element can be agency to heat the material at to be deposited 3 so as to:

reduce the viscosity of the material to be deposited 3, and/or liquefy the material to be deposited 3, and/or adapting the viscosity of the material to be deposited 3 so that the quantity deposited is constant when the surrounding temperature varies, and/or the material to be deposited 3 may be a material to be extruded, and/or the processing unit is programmed and/or configured to implement additive manufacturing from digital file (s), and/or the deposition system 1 comprises a temperature regulating element of the deposition surface 23, and/or the deposition system 1 comprises a removable tip 21 connected to the container 2, the removable tip 21 has the outlet 5 through which the material to be deposited 3, and/or the deposition system 1 comprises a cleaning system of the container 2 and/or the tip 21 of the container 2, and/or the according to the second embodiment, wherein the adjusting pressure PM and the deposition pressure PD, or each of the deposition pressures PDi, are lower than or equal to 200 kPa above the atmospheric pressure, and/or the method according to the second embodiment, in which the adjusting pressure PM can be lower than the atmospheric pressure, and/or the method according to the second embodiment, wherein the adjusting pressure PM and the deposition pressure PD, or each of the deposition pressures PDi, are lower than the atmospheric pressure, and/or the method according to the second operating procedure is executed in a deposition system 1 in which the deposition pressure PD, or several of the deposition pressures PDi, of gas injected into the container 2 is obtained by:

mixture of gases from the adjusting source R and gas from at least one of the deposition sources P1, Pi, and/or mixture of gases from a deposition source P1, Pi and gas from at least one other of the deposition sources P1, Pi, and/or decreasing or increasing the gas pressure from at least one of the deposition sources P1, Pi, and/or increasing in gas pressure from the adjusting source R.

the method according to the second embodiment, comprising an indirect application, on the material to be deposited 3, of the pressure exerted by a gas, the application of the pressure being exerted on a slidable element 13 in the container 2 and disposed in contact with the material to be deposited 3, and/or the method according to the second embodiment, comprises Cross-linking of the material deposited on the deposition surface 23, and/or disinfection of the deposition surface 23 by means of a light emitter, the light emitter preferably emitting photons with a wavelength of between 150 and 600 nm, and/or the method according to the second embodiment comprises:
- an etching of the deposition of material and/or of the deposition surface 23 and/or of a part comprising the deposition surface 23, and/or
- a cutting of the deposited material and/or of the deposition area and/or a part comprising the deposition surface 23, and/or
- an annealing of the deposition, and/or the method according to the second embodiment is implemented in a deposition system 1 in which the outlet 5 is located in a cabinet with a specific atmosphere; the method further comprises a control of the atmosphere in the deposition area, the deposition atmosphere comprising:
- a filtration of the atmosphere in order to control a particle concentration in the atmosphere introduced into the chamber, and/or
- sterilization of the atmosphere and/or the deposition zone and/or the container and/or the substance/material/matter to be deposited, and/or
- a modification of a humidity level of the atmosphere, and/or
- a modification of a deposition temperature, and/or the method according to the second embodiment, comprises a step of heating the material to be deposited 3 in order to perform an extrusion of the material 3 contained in the container 2, and/or the method according to the second embodiment, comprises an implementation of an additive manufacturing from digital file (s), and/or the method according to the second embodiment comprises regulating a temperature of the deposition surface 23, and/or the method according to the second embodiment, comprises a step of cleaning all or part of the container 2.

In addition, the different characteristics, shapes, variants and embodiment modes of the invention may be associated with each other in various combinations to the extent that they are not incompatible or exclusive of each other.

The invention claimed is:

1. A deposition system comprising:
   a container arranged to contain material to be deposited and comprising an inlet and an outlet;
   a pneumatic system arranged to inject, through the inlet, gas into the container such that this gas exerts, directly or indirectly, a pressure on the material to be deposited;
   the deposition system comprising control means of the pneumatic system arranged to control at least:
   an injection, through the inlet, of gas at an adjusting pressure, so that a convex meniscus of material to be deposited protrudes from the container at the outlet, and then
   at least one injection, through the inlet, of gas at respectively at least one deposition pressure greater than the adjusting pressure, so that the material to be deposited flows out of the container through the outlet.

2. The deposition system according to claim 1, wherein the control means of the pneumatic system are arranged to control several injections, through the inlet, of gas at several deposition pressures different from each other so that the material to be deposited flows out of the container through the outlet at different speeds, said deposition pressures being greater than the adjusting pressure.

3. The deposition system according to claim 1, wherein the pneumatic system comprises a source, called adjusting source, arranged to produce gas at the adjusting pressure and at least one source, called deposition source, arranged to produce gas at at least one source pressure, said at least one source pressure being at least 1.01 time greater than the adjusting pressure.

4. The deposition system according to claim 3, wherein the pneumatic system comprises a single deposition source.

5. The deposition system according to claim 4, wherein the source pressure is greater than the deposition pressure, or than at least one of the deposition pressures.

6. The deposition system according to claim 4, wherein the source pressure is lower than the deposition pressure, or than at least at one of deposition pressures.

7. The deposition system according to any one of claim 4, wherein the source pressure is equal to the deposition pressure, or to one of the deposition pressures.

8. The deposition system according to claim 4, wherein the pneumatic system is arranged such that the deposition pressure, or more of the deposition pressures, of gas injected into the container is obtained by:
   mixing gas from the adjusting source and gas from the deposition source, and/or
   decreasing or increasing of the gas pressure from the deposition source, and/or
   increasing the gas pressure from the adjusting source.

9. The deposition system according to claim 3, wherein the pneumatic system comprises a plurality of deposition sources, each of said plurality of deposition sources being arranged to produce gas at a source pressure different from each of the other source pressures of the other deposition sources.

10. The deposition system according to claim 9, wherein each source pressure is equal to a different deposition pressure.

11. The deposition system according to claim 9, wherein at least one source pressure is greater than the deposition pressure, or than each deposition pressure.

12. The deposition system according to claim 9, wherein at least one source pressure is lower than the deposition pressure, or than each deposition pressure.

13. The deposition system according claim 10, wherein the pneumatic system is arranged so that the deposition pressure, or more of the deposition pressures, of gas injected into the container is obtained by:
   mixing gas from the adjusting source and gas from at least one of the deposition sources, and/or
   mixing gas from a deposition source and gas from at least one of the other deposition sources, and/or
   decreasing or increasing the gas pressure, said from at least one of the deposition sources, and/or
   increasing the gas pressure from the adjusting source.

14. The deposition system according to claim 3, wherein the adjusting source and/or each deposition source is a gas tank storing gas at its respective adjusting pressure and/or source pressure.

15. The deposition system according to claim 14, wherein each considered gas tank has a volume at least 5 times greater than the sum of the volume of the container and the volume of a gas circuit connecting this considered gas tank to the inlet.

16. The deposition system according to claim 3, wherein the control means comprise a multichannel valve, called switching valve, connected to:

the inlet of the container,
at least one of the sources,
a venting system,
said multichannel valve being arranged to switch from an injection of gas from a deposition source or from an adjusting source towards an injection of gas from another deposition source or adjusting source so as to produce an instantaneous change in pressure in the container.

17. The deposition system according to claim 1, wherein the adjusting pressure and the deposition pressure, or each of the deposition pressures, are lower than or equal to 200 kPa above atmospheric pressure.

18. The deposition system according to claim 1, wherein the adjusting pressure is lower than the atmospheric pressure.

19. The deposition system according to claim 1, comprising a system arranged to:
   setting in motion the container relatively to a deposition surface, or conversely, in a plane parallel to the deposition surface, said plane xy, according to a predetermined path, and/or
   moving away and/or bringing closer the container relatively to the deposition surface, or conversely.

20. The deposition system according to claim 19, comprising a processing unit programmed and/or configured to control an amount of material deposited on the deposition surface depending on a relative position of the container with respect to said surface by producing:
   a modification, and/or an adaptation, of the relative velocity of the container with respect to the deposition surface, or conversely, and/or
   a modification, and/or an adaptation, of a distance between the outlet of the container and the deposition surface, and/or
   a modification, and/or adaptation, of the deposition pressure selected.

21. The deposition system according to claim 20, comprising one or more optical imaging devices arranged to image a deposition area, and/or an area comprising the outlet of the container, and/or at least a part of the deposition area, so that the processing unit is arranged to monitoring the amount of material deposited and/or the relative position of the container with respect to the deposition surface and, depending on this monitoring, is arranged to modify and/or adjust:
   the gas pressure injected into the container, and/or
   a relative movement speed of the container relative to the deposition area, or conversely, and/or
   the distance between the outlet and the deposition area, and/or
   the relative position of the container relative to the deposition surface.

22. The deposition system according to claim 20, comprising a distance sensor arranged to, prior to the deposition of the material to be deposited, measuring a topography of the deposition surface along the predetermined path along which the material to be deposited will be deposited so as, during the deposition, to maintain a constant distance between the outlet of the container and the deposition surface during displacement of container according to the predetermined path.

23. The deposition system according to claim 16, wherein the control means comprise a pressure regulating multichannel valve, said deposition valve, being located, with respect to a gas path extending from the adjusting and deposition sources to the container, downstream of the deposition source and upstream of the multichannel switching valve and being arranged for decrease, or respectively increase, the gas pressure of a deposition source to an intermediate deposition pressure lower than, or respectively greater than, the source pressure of this deposition source and greater than the adjusting pressure, and wherein the control means are arranged to supply gas at the intermediate deposition pressure in a portion of a circuit, constituting a deposition source, connecting said deposition valve to said multichannel switching valve.

24. A deposition method implemented in a deposition system, said system comprising:
   a container in which there is material to be deposited and comprising an inlet and an outlet,
   a pneumatic system comprising control means of the pneumatic system,
said method comprising: the pneumatic system injects, through the inlet, gas into the container so that the gas exerts, directly or indirectly, a pressure on the material to be deposited, the method comprising a control, by the control means of the pneumatic system:
   of an injection of gas, via the inlet, at an adjusting pressure, so that a convex meniscus of material to be deposited protrudes from the container at the outlet, and
   of at least one injection of gas, though the inlet, at respectively at least one deposition pressure greater than the adjusting pressure, so that the material to be deposited flows out of the container in a material deposition on a deposition surface.

25. The deposition method according to claim 24, comprising a control, by the control means, of several injections, through the inlet, of gas at several deposition pressures different from each other, so that the material to be deposited flows at different speeds out of the container through the outlet, said deposition pressures being greater than the adjusting pressure.

26. The deposition method according to claim 24, comprising:
   between the gas injection at the adjusting pressure and the at least one gas injection at the least at the one deposition pressure, a decrease of a distance between the meniscus and the deposition area until a capillary bridge is formed between said deposition surface and the meniscus,
   subsequent to the formation of the capillary bridge, the at least at the one gas injection at the at least one deposition pressure,
   subsequent to the at least one injection of gas at the at least one deposition pressure, a new gas injection at the adjusting pressure so that the material to be deposited no longer flows out of the container,
   subsequent to the new gas injection at the adjusting pressure, an increase of the distance between the meniscus and the deposition surface until rupture of the capillary bridge between the deposition surface and the meniscus.

27. The deposition method according to claim 24, wherein the pneumatic system comprises a source, called adjusting source, producing gas at the adjusting pressure and at least one source, called deposition source, producing gas at at least one source pressure, said at least one source pressure being at least 1.01 times greater than the adjusting pressure.

* * * * *